United States Patent [19]
Grondalski

[11] Patent Number: 6,108,763
[45] Date of Patent: Aug. 22, 2000

[54] SIMULTANEOUS PARITY GENERATING/READING CIRCUIT FOR MASSIVELY PARALLEL PROCESSING SYSTEMS

[76] Inventor: Robert S. Grondalski, 12 Nick La., Maynard, Mass. 01754

[21] Appl. No.: 08/317,411

[22] Filed: Oct. 3, 1994

Related U.S. Application Data

[63] Continuation of application No. 07/826,907, Jan. 24, 1992, abandoned, which is a continuation-in-part of application No. 07/121,563, Nov. 16, 1987, Pat. No. 5,230,079, which is a continuation-in-part of application No. 06/909,013, Sep. 18, 1986, Pat. No. 4,985,832, and a continuation-in-part of application No. 07/018,937, Feb. 25, 1987, abandoned.

[51] Int. Cl.[7] ................................................. G06F 15/80
[52] U.S. Cl. ............................................................. 712/10
[58] Field of Search ........................ 395/800; 371/49.1, 371/49.2, 49.3, 37.6; 712/10

[56] References Cited

U.S. PATENT DOCUMENTS

| | | | |
|---|---|---|---|
| 3,938,083 | 2/1976 | Stansfield | 371/49.3 |
| 4,079,455 | 3/1978 | Ozga . | |
| 4,247,892 | 1/1981 | Lawrence . | |
| 4,314,349 | 2/1982 | Batcher . | |
| 4,346,474 | 8/1982 | Sze | 371/49.3 |
| 4,370,709 | 1/1983 | Fosdick . | |
| 4,380,046 | 4/1983 | Fung . | |
| 4,382,277 | 5/1983 | Glaser et al. . | |
| 4,396,979 | 8/1983 | Mor et al. . | |
| 4,453,251 | 6/1984 | Osman | 371/50.1 |
| 4,498,133 | 2/1985 | Bolton et al. . | |
| 4,498,134 | 2/1985 | Hansen et al. . | |
| 4,507,726 | 3/1985 | Grinberg et al. . | |
| 4,514,807 | 4/1985 | Nogi . | |
| 4,524,428 | 6/1985 | Grinberg et al. . | |
| 4,538,271 | 8/1985 | Kohs | 371/49.2 |
| 4,543,642 | 9/1985 | Hansen . | |
| 4,589,067 | 5/1986 | Porter et al. . | |
| 4,621,339 | 11/1986 | Wagner et al. . | |
| 4,622,632 | 11/1986 | Tanimoto et al. . | |
| 4,644,496 | 2/1987 | Andrews . | |
| 4,709,327 | 11/1987 | Hillis et al. . | |
| 4,727,474 | 2/1988 | Batcher . | |
| 4,736,291 | 4/1988 | Jennings et al. . | |
| 4,783,732 | 11/1988 | Morton . | |
| 4,823,347 | 4/1989 | Chin et al. | 371/49.1 |
| 4,827,403 | 5/1989 | Steele, Jr. et al. . | |
| 4,891,751 | 1/1990 | Call et al. . | |

FOREIGN PATENT DOCUMENTS

| | | |
|---|---|---|
| 76101354 | of 0000 | Taiwan . |
| WO 83/02180 | 6/1983 | WIPO . |

OTHER PUBLICATIONS

Hillis, *The Connection Machine*, M.I.T. Press, 1985, pp. 1–90.

Potter, (ed), *The Massively Parallel Processor*, M.I.T. Press, 1985, pp. 145–216.

Batcher, "Design of a Massively Parallel Processor," *IEEE Transactions on Computers*, vol. C–29, No. 9, pp. 836–842 (1980).

(List continued on next page.)

*Primary Examiner*—John A. Follansbee

[57] ABSTRACT

A processing array including a plurality of processing elements; and an interconnection network connected to all of the processing elements for carrying data messages between the processing elements, wherein each of the processing elements of the plurality of processing elements includes a parity generating circuit for generating a parity bit for a first data message that is transmitted by that processing element over the interconnection network to another processing element among the plurality of processing elements; and a parity checking circuit for checking parity of a second data message as it is received by that processing element over the the interconnection network, the parity checking and parity generating circuits being separate from each other and enabling that processing element to generate parity for the first data message being sent by that processing element while simultaneously checking parity of the second message received by that processing element.

8 Claims, 15 Drawing Sheets

OTHER PUBLICATIONS

Hillis, "The Connection Machine", MIT Artificial Intelligence Laboratory A.1. Memo No. 646 (1981).

Hoshino, "An Invitation to the World of PAX", *IEEE*, May 1986, pp. 68–80.

NCR Corporation, "Geometric Arithmetic Parallel Processor", pp. 1–12 (1984).

NCR Corporation, "Detection of Edges and Gradients in Binary and Gray Scale Images with the GAPP Processor", pp. 1–23 (1985).

SIMULTANEOUS PARITY GENERATING/READING CIRCUIT FOR MASSIVELY PARALLEL PROCESSING SYSTEMS

CROSS-REFERENCE TO RELATED PATENT APPLICATIONS

This application is a continuation of application Ser. No. 07/826,907, filed Jan. 24, 1992, now abandoned, which is a CIP of application Ser. No. 07/121,563, filed Nov. 16, 1987, now U.S. Pat. No. 06/909,013, which is a CIP of application Ser. No. 06/909,013, filed Sep. 18, 1986, U.S. Pat. No. 4,985,832, and a CIP of application Ser. No. 07/018,937, filed Feb. 25, 1987, Abandoned.

BACKGROUND OF THE INVENTION

The invention relates to array processing systems which incorporate a large number of processors that are interconnected in a regular connection structure and in which all of the processors receive the same instruction from a common control structure.

Digital computers may be grouped into four categories which are specified in terms of the way in which the computer handles the instructions and the data. The four categories are: Single Instruction stream—Single Data stream (SISD) machines, Single Instruction stream—Multiple Data stream (SIMD) machines, Multiple Instruction stream—Single Data stream (MISD) machines, and Multiple Instruction stream—Multiple Data stream (MIMD) machines. Serial computers, that is, systems that have a single processor such as the personal computers with which many people are familiar, fall within the first category. Parallel computers, which are systems that include more than one processor, fall within one of the last three categories.

Both serial and parallel computers are capable of performing some level of parallelism. For example, by using pipelining, the SISD machines can achieve a temporal parallelism according to which the computer simultaneously processes multiple instructions of a given type from the instruction sequence. Computers that have multiple processing elements can achieve spatial parallelism in which different processing elements simultaneously process different instructions or different data using the same instructions.

The particular machine which will be described in this application is an SIMD machine. In general, SIMD machines include an array of processing elements that are supervised by a central array control unit. In some SIMD machines each processing element in the array also has its own associated local memory. In such machines, the array control unit distributes data that is to be processed among the local memories so that each memory contains a different segment of the data. Then, the array control unit sends the same sequence of instructions to each of the processing elements. Each processing element executes the sequence of instructions in synchronization with the other processing elements but does so on a different set of data using its own locally stored data.

One of the original motivations for developing SIMD machines and other parallel computers was to solve vector or matrix type problems, i.e., computations having an inherent parallel structure to them. Characteristically, such problems involve performing the same sequence of operations on many different data elements. Often the computations can be organized such that there are no dependencies between operations which are performed on different parts of the data. Thus, the computations readily lend themselves to being performed in a parallel fashion on a SIMD machine in which each processing element works on a different part of the data. Examples of several computations for which algorithms have been developed to exploit the parallelism of the SIMD machines include matrix multiplication, image processing, the fast Fourier transform (FFT), solving simultaneous partial differential equations, and parallel sorting.

Obviously, one should be able to achieve a considerable speed advantage by performing operations in parallel on multiple processing elements in this fashion. Indeed, as a first guess one might expect that as "n" the number of processing elements increases, the speed advantage should increase proportionally. In an attempt to exploit the obvious speed advantage that should result from using a large numbers of processing elements, certain companies are manufacturing SIMD machines, sometimes referred to as massively parallel processors, in which the processing elements number in the tens of thousands. However, due to practical considerations such as the inevitable memory access conflicts, inefficiencies and difficulties in fully exploiting the concurrency in computing problems and design limitations, the actual speed up is usually considerably less than a factor of n. Taking into account the inherent difficulties of fully exploiting the parallel computing capabilities of a multiple processing element system, it has been estimated that actual speed up falls somewhere within a range having a lower bound of $\log_2 n$ and an upper bound of $n/(\ln n)$.

SUMMARY OF THE INVENTION

In general, in one aspect, the invention features a processing array including a plurality of processing elements; and an interconnection network connected to all of the processing elements for carrying data messages between the processing elements. Each of the processing elements of the plurality of processing elements includes a parity generating circuit for generating a parity bit for a first data message that is transmitted by that processing element over the interconnection network to another processing element among said plurality of processing elements; and it includes a parity checking circuit for checking parity of a second data message as it is received by that processing element over the the interconnection network. The parity checking and parity generating circuits are separate from each other and enable the processing element to generate parity for the first data message while simultaneously checking parity of the second message.

Preferred embodiments include the following features. In each of the processing elements, the parity generating circuit for that processing element includes an exclusive OR circuit which performs an exclusive OR operation on the first data message that is transmitted by that processing element to generate a parity bit for the message. Also, in each of the processing elements, the parity checking circuit includes a logic box that is configurable to perform a selected one of a plurality of different logic operations including an exclusive OR operation. When the parity checking circuit is performing a parity checking function, its logic box is configured to perform the exclusive OR operation on the second data message. Each processing processing element also includes an output data path for carrying the second data message as it is being transmitted by that processing element; and a memory connected to the output data path which stores the second data message prior to its being transmitted by that processing element. The parity generating circuit for that processing element is connected to the output data path for that processing element. Also, in each processing element, the parity generating circuit includes means for placing the parity bit which it generates for the first data message onto the output data path at the end of the first data message.

Also in preferred embodiments, each processing element includes an input data path for carrying the second data message that is received by that processing element as it is being received; and a shift register connected to the input data path for receiving and holding the second data message received over the input data path. The parity checking circuit in each processing element is connected to the input data path for that processing element. Also, in each processing element, the input data path includes a multiplexer having an input connected to the output data path of that processing element. The mulitplexer enables the output data path to be electrically coupled to or isolated from the input data path depending upon the state of the mulitplexer.

Grid communications imply two messages at every processing element, namely, an incoming message from the processing lement on one side of the current processing element and an outgoing message to the processing element on the other side of the current processing element. Since every processing element must process two messages, the invention makes grid communications on massively parallel SIMD machines run twice as fast as is possible using the current parity checking techniques. In addition, the invention eliminates any need be to buffer one message while the parity of the other message is being checked.

Other advantages and features will become apparent from the following description of the preferred embodiment and from the claims.

DESCRIPTION OF THE PREFERRED EMBODIMENT

STRUCTURE AND OPERATION

I. General Description of Array Processor

Figure 1:
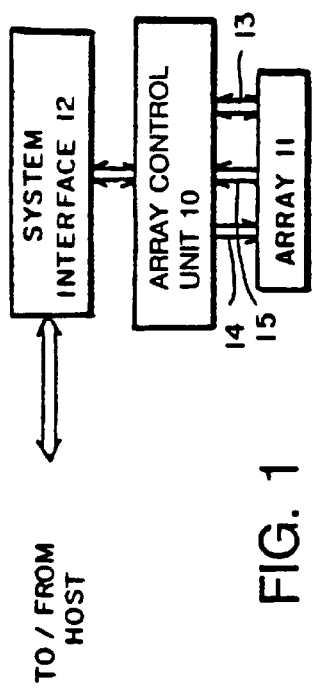
FIG. 1 is a general organizational diagram depicting the general components of an array processing system, including a processor array constructed in accordance with the invention.

With reference to FIG. 1, an array processor constructed in accordance with the invention includes three major sections, including an array control unit 10, a processor array 11 and a system interface 12. The control unit 10 receives data and instructions from a host data processing system (not shown) through the interface 12, transmits the data to the array 11 over a bus 13 and issues to the array 11 microwords over a bus 14 and other timing and control signals as described below. The microwords enable the array 11 to process the data in accordance with the host's instructions. The microwords include fields defining various PROC OP processor operation signals to identify selected operations, MEM ADRS memory address to identify a memory address, and other operational control signals.

During execution of the microinstructions, the processor array 11 may transmit various status signals back to the array control unit over a status bus 15. These status signals are used by the array control unit 10, as described below, in the selection of the microinstructions to be issued to the processor array. After the processor array performs all of the operations responsive to the microinstructions from the array control unit in processing the instruction from the host data processing system, the control unit 10 then enables the processing array 11 to transmit the processed data to the array control unit 10 over bus 13, and the array control unit may then transmit it to the host through system interface 12.

II. General Organization of Processor Array 11

Processor array 11 includes two general portions, namely a large number of processor elements (PE's) 21 on a plurality of processor element (PE) chips 20, and a mechanism for transferring information to and from the array control unit 10 and among the processor elements. In one specific embodiment, each PE chip includes thirty-two processing elements. As described in more detail below in connection with FIG. 4, each processor element includes a processor, including circuitry for performing selected arithmetic and logical operations, and an associated memory. In the aforementioned specific embodiment, each memory has a capacity of 1024 bits (1 Kb) organized into 128 bytes.

Figure 3:
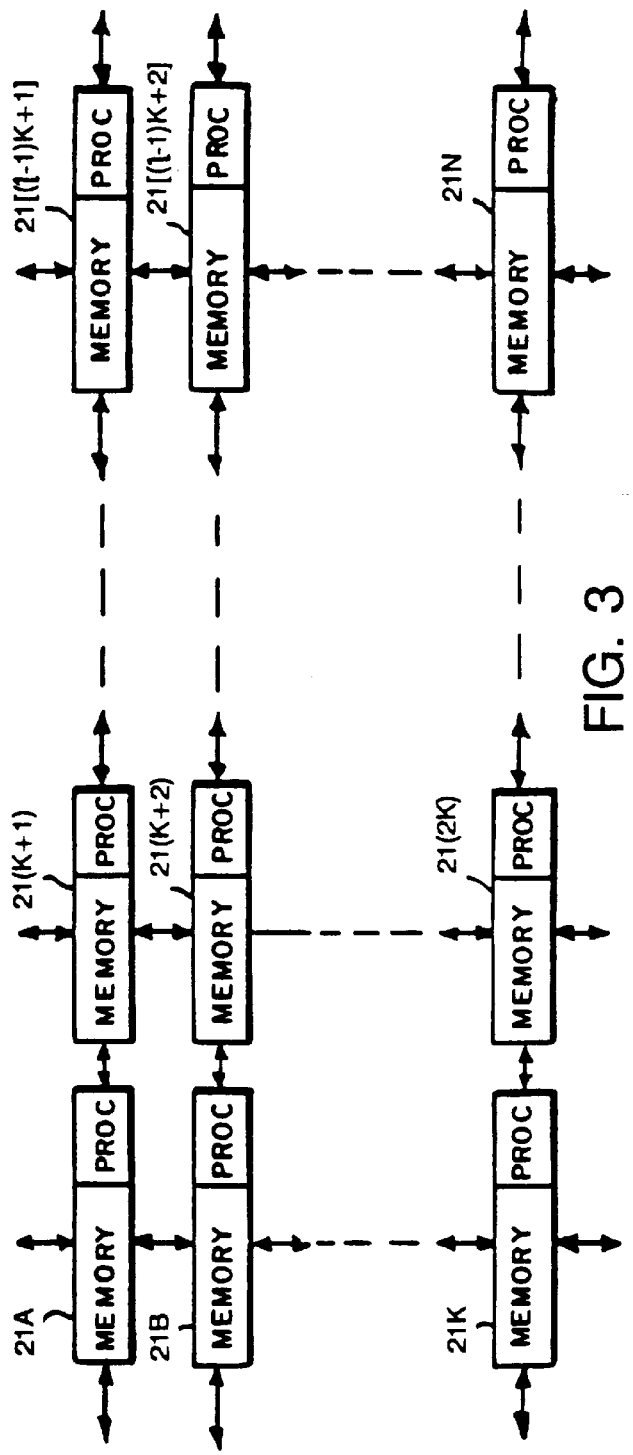
FIG. 3 is another more detailed block diagram of the processor array depicted in FIG. 1, depicting another mechanism for transferring information through the array.
Figure 2:
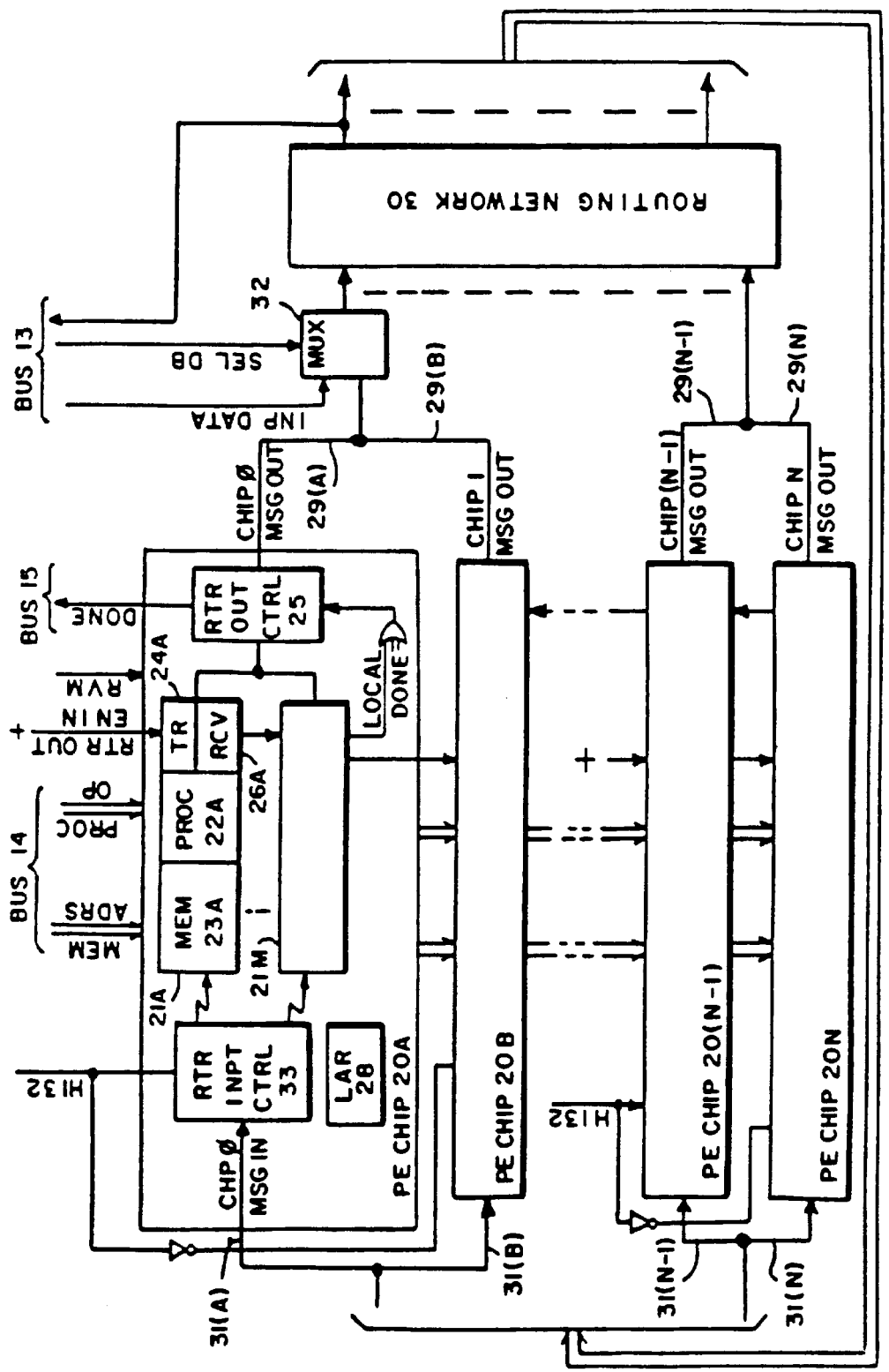
FIG. 2 is a more detailed block diagram of the processor array depicted in FIG. 1, depicting one mechanism for transferring information through the array.
Figure 4:
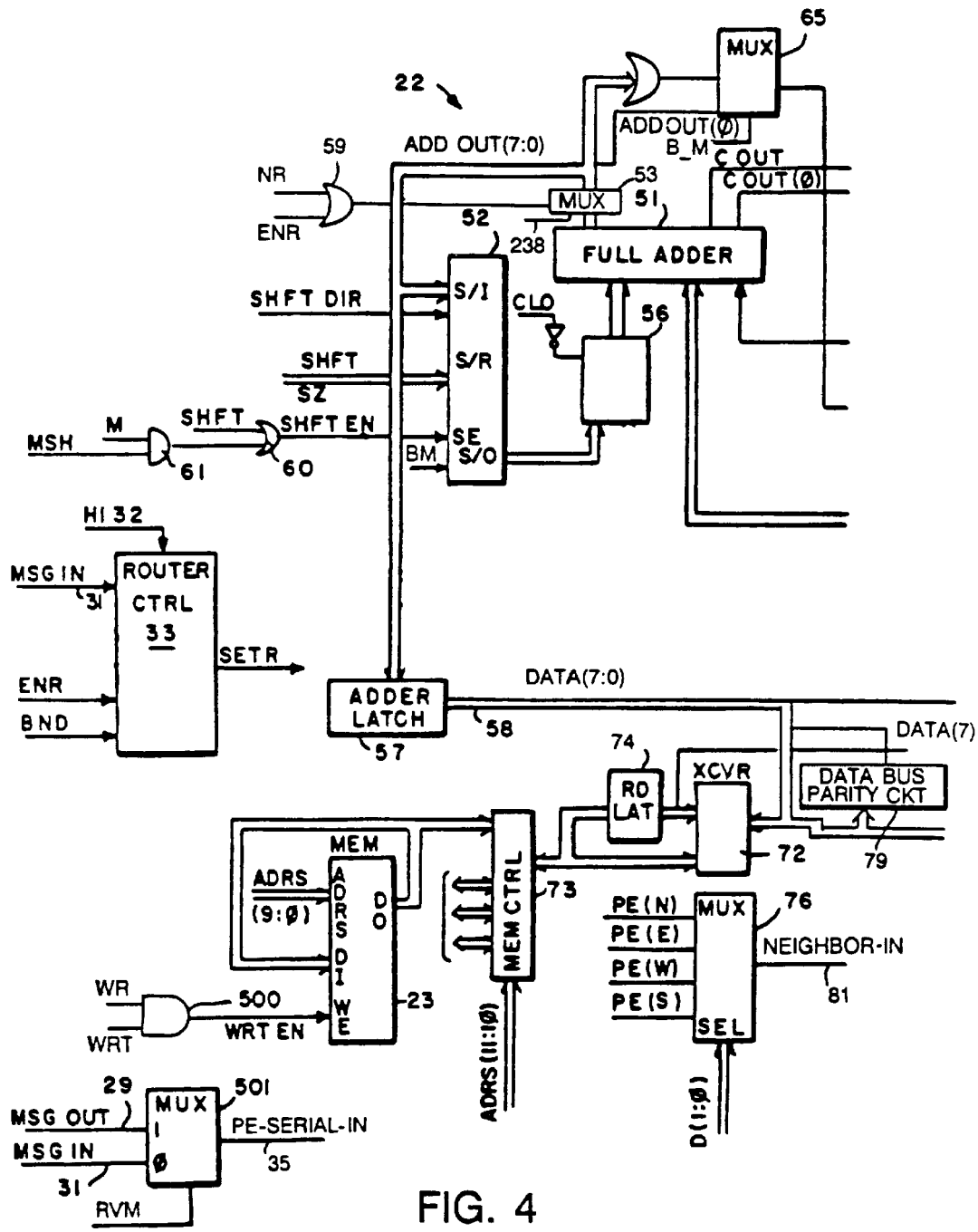
FIG. 4 is a detailed block diagram of a processor element forming part of the processor array depicted in FIG. 1.
Figure 4A:
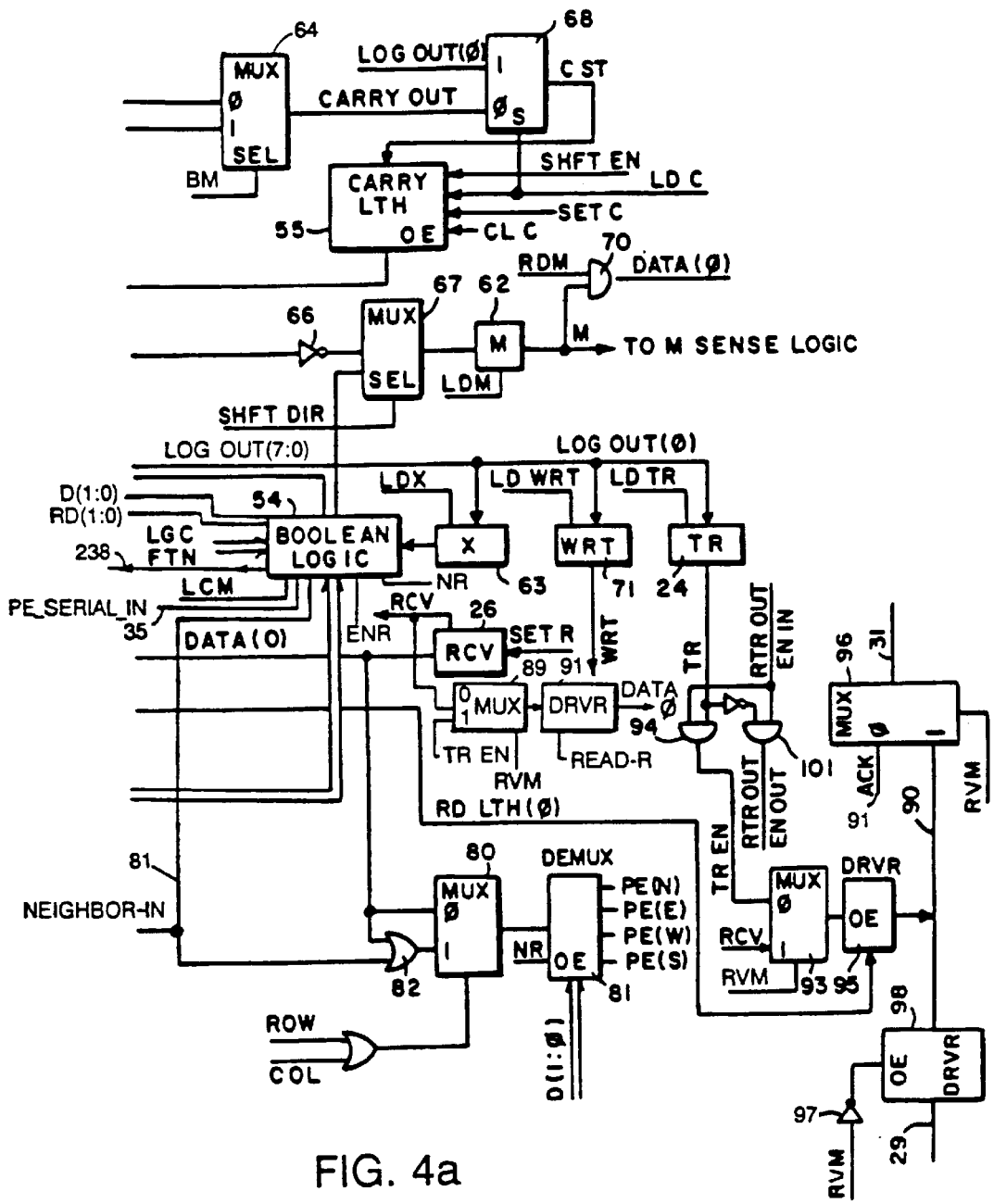

The PE's have two mechanisms for transferring information to other processors. In one mechanism, a "random transfer" mechanism, which is generally depicted in FIG. 2, each PE can send a message to any other PE. In the second mechanism, a "nearest neighbor" mechanism, which is illustrated in FIG. 3, the PE's are interconnected in a "nearest neighbor" mesh manner with four other PE's, and each PE may send information only to one of those four PE's to which it is directly connected. In the random transfer mechanism, communications are maintained over a routing network 30 (see FIG. 2), which is described in U.S. Pat. No. 4,985,832 issued Jan. 15, 1991 and in U.S. patent application Ser. No. 07/121,563, filed Nov. 11, 1987, both of which are incorporated herein by reference. Circuits for implementing the second mechanism (that is, the nearest neighbor mechanism) are depicted in FIG. 4.

With reference to FIG. 2, a plurality of PE chips 20A through 20N (generally identified by reference numeral 20) are depicted. Each PE chip 20 has a plurality of PE's. Since the PE chips are similar, only chip 20A is shown in detail. PE chip 20A includes a plurality of PE's 21A through 21M in an ordered hierarchy. Each PE includes a processor 22A through 22M and a memory 23A through 23M. When a PE is to transmit a message, it's TR transmit request flag 24A through 24M is set. When its RTR OUT EN IN router out enable in signal is then asserted, the PE is enabled to transmit the message, which normally includes the identification of the intended recipient PE followed by data, through a router output control circuit. After the message transfer operation has completed, the transmitting PE's TR transmit request flag is reset.

The RTR OUT EN IN router out enable in signal is a daisy-chained enable signal. When it becomes the PE's turn to send a message, which occurs when its RTR OUT EN IN router out enable in signal is asserted, it transmits its message signals through a router output control circuit 25, which transmits the message from the PE chip 20A as a CHP 0 MSG OUT chip (0) message out signal onto line 29(A).

After a PE's message operation has been completed, the TR transmit request flag 24 is reset and the PE 21 asserts a RTR OUT EN OUT router out enable out signal, which is daisy-chained to the next PE as its RTR OUT EN IN router out enable in signal. If that PE's TR transmit request flag 24 is set, that PE is enabled to transmit a message. If the TR transmit request flag 24 is cleared the PE does not transmit a message, but instead asserts the RTR OUT EN OUT router out enable out signal which is daisy-chained as the RTR OUT EN IN router out enable in signal of the next PE 21. After messages have been sent and acknowledged for all of the PE's whose TR transmit request flags 24A through 24M were initially set, the control circuit 25 generates a LOCAL DONE signal, which is ORed with LOCAL DONE signals from other PE chips to form a DONE signal. The DONE signal is transmitted over status bus 15 to the array control unit 10 to indicate that all PE's have transmitted messages.

In one specific embodiment, to reduce the number of input terminals to the routing network 30, the PE chips 20A through 20N are paired in their transmission of messages through the routing network. With reference to FIG. 2, the last PE 21(M) on PE chip 20A provides the RTR OUT EN IN router out enable in signal to the first PE 21 on PE chip 20B. Thus, after all messages have been transmitted from PE chip 20A and acknowledged, PE chip 20B begins transmitting messages.

The message outputs of selected ones of the PE chips 20A through 20N are connected to multiplexers 32 which selectively couple the outputs of the PE chips or the data signals from the data bus 13 to the routing network. The routing network 30 thus facilitates the transfer of data from the array control unit 10 into the processor array 11. More specifically, with reference to PE chip 20A, the output circuit 25 of PE chip 20A is connected to one input terminal of a multiplexer 32. The other input terminal of multiplexer 32 is connected to one line of data bus 13. The multiplexer is controlled by a SEL DB select data bus signal which, when asserted, enables the multiplexer 32 to couple the signals on the line of data bus 13 to the routing network 30. When the SEL DB select data bus signal is not asserted, the multiplexer 32 couples the signals from the PE chips to the routing network 30.

The output signals from the routing network 30 (described in greater detail in U.S. Pat. No. 4,985,832 and U.S. patent application Ser. No. 07/121,563) are coupled as CHP X MSG IN chip (x) message input signals ("X" refers to the particular PE chip pair) on lines 31(A) through 31(N) to message input terminals on the PE chips 20A through 20N, and specifically to a router input control circuit 33 shown in PE chip 20A. The router input control circuit first determines whether or not the message is for a PE on the PE chip on which it resides. This determination is made in response to the a portion of the address field of the received message, in particular first signal received by the router input control circuit, and by the condition of a HI 32 signal. As shown in FIG. 2, the HI 32 signal is transmitted in uncomplemented form to one of each pair of PE chips, such as PE chips 20A and 20(N−1), and in complemented form to the other PE chips, such as PE chips 20B and 20N. If the router input control circuit 33 receives the uncomplemented HI 32 signal it accepts the messages for which the first signal is asserted, but if the router input control circuit 33 receives the complemented HI 32 signal, it accepts the messages for which the first signal is negated. The remainder of the address field identifies the PE 21 which is the intended recipient of the message, and the router input control circuit directs the message to the PE 21 so identified. The input control circuit sets the RCV receive flag 26 of the receiving PE and directs the data portion of the message to that PE's boolean logic box 54 which contains circuitry for sending the received data to the shift register within the PE (to be described later).

In the transfer of a message from a particular transmitting PE 21 through the routing network 30 to a recipient PE 21, the address essentially establishes a transfer path. If the RVM reverse mode signal from the control microword from array control unit 10 is asserted after the transfer path has been established, the transfer direction through routing network 30 is reversed. Accordingly, the PE 21 whose RCV flag 26 is set is enabled to transmit data onto line 31 and the routing network 30 couples the data to the appropriate line 29. The output control 25 then couples the received data to boolean logic box 54 of the PE 21 which transmitted the original message, that is, the PE 21 associated with the first set TR flag 24 in the hierarchy. If the RVM reverse mode signal is later negated, data may again be transferred over the established transfer path in the forward direction. Accordingly, by suitable conditioning of the RVM reverse mode signal, transfers may take place in either direction over the transfer path.

As described above, the control microword includes a memory address field which provides MEM ADRS memory address signals to the PE's 21. In addition, a local address register 28 is provided, which can be used by the PE's when a LAM local address mode signal from the control microword is asserted. The local address register can be loaded by a message from routing network 30, and so a message itself can contain the particular destination address in the identified PE's memory into which it is to be stored. After the local address register is loaded, it normally automatically increments to identify the next location in memory, which simplifies use during a message transfer. A PE 21 may also load the local address register 28 and use it, thereby allowing the PE to be indirectly addressed. The local address register is described in more detail in the previously cited patent applications.

The output signals from selected ones of the lines from routing network 30 are also coupled to data bus 13 to carry data output signals to the array control unit 10.

The "nearest neighbor" message transfer mechanism is depicted in FIG. 3. With reference to FIG. 3, a plurality of PE's 21A through 21N are depicted organized in an array pattern of a plurality of "K" rows and "L" columns, where N=KL. Each PE's 21A through 21N can transmit information, in the form of signals, to its four nearest neighbors in the array. Specifically, for example, PE 21(K+2) can transmit signals "westwardly" to PE 21B and "northwardly" to PE 21(K+1) (shown on FIG. 3), and "southwardly" to PE 21(K+3) and "eastwardly" to PE 21(2K+2) in a row and column not shown in FIG. 3. The PE's in the leftmost column, as shown in FIG. 3, that is PE's 21A through 21K, can transmit signals westwardly to the rightmost column as shown in FIG. 3, that is, to PE's 21[(L−1)K+1] through 21N, and the PE's in the rightmost column can transmit signals eastwardly to the PE's in the leftmost column. Similarly, the PE's in the top row, that is, PE's 21A, 21(k+1) . . . 21[(L−1)K+1], can transmit signals northwardly to the PE's in the bottom row, that is PE's 21K, 21(2K) . . . 21N, and the PE's in the bottom row can transmit signals southwardly to the PE's in the top row. The mechanism used by the PE's to transmit in the "nearest neighbor" mode will be described below in connection with FIG. 4.

The nearest neighbor message transfer mechanism may also be used for input of signals, representing data, to the array 11 or output of data from array 11. In particular, with reference to FIG. 4, a multiplexer network (not shown) may be connected at the left side of the array, for example to permit data to be loaded into the leftmost column of PE's data from either the rightmost column or from an external data source. The data is initially latched by the leftmost column and is transmitted to the next column, that is PE's 21(K+1) through 21(2K) as more data is latched by the leftmost column. That process continues until data has been passed throughout the entire array.

The output of data is effectuated by means of the nearest neighbor transfer mechanism by providing a set of output drivers (not shown) which are connected to a set of appropriate receiving and recording circuits. The output drivers may be connected to, for example, the eastward transmission terminals of the rightmost column of the array to receive data signals from the lines which also connect the PE's along that column to the PE's on the leftmost column. To allow data to be retrieved from the array 11, the PE's are enabled to transmit the data in an easterly direction while recording the outputs of the output drivers. After the data from the leftmost column has returned to it, data from all of the PE's in the array will have passed through the rightmost column of PE's and have been transmitted by the drivers.

III. Processing Element

A. General Description (Discussion of FIG. 4)

With reference to FIG. 4, a PE constructed in accordance with the invention includes a full adder 51 which receives input signals from a shift register 52, from a Boolean logic circuit 54, and from a carry latch 55. A coupling circuit 56 couples the output signal from the S/O shift out output terminals of shift register 52, in response to a negated CLO clear shift register output signal from the control microword received from the array control unit 10 over bus 14 (FIG. 1). As is typical in an array processing system, during any given operating cycle, as governed by one or more clock signals (not shown), a single control microword is transmitted by the array control unit 10 to all of the PE's in the array 11 to control the operations of the PE's in the array 11 during that cycle. Depending on the condition of one or more flags, as described below, a PE may or may not perform the operations enabled by the control microword.

If a CLO clear shift register output signal from the control microword is negated, coupling circuit 56 is enabled to couple the output signal from shift register 52 to the connected input of the adder 51. By asserting the CLO signal, the array control unit enables the coupling circuit 56 to couple an output signal having an effective value of zero to the input of adder 51. This provides a mechanism for loading a value into a shift register prior to performing an arithmetic operation.

Shift register 52 operates in response to a number of control signals from the control microword. The shift register is of variable effective length, that is, the output bit position from which output signals are transmitted to multiplexer 56 can be varied in response to a SHFT SZ (shift register size) signal from the control microword. In one embodiment, shift register 52 has effective lengths of eight, sixteen, twenty-four, thirty-two, forty, forty-eight, fifty-six and sixty-four bits and may be used for performing integer arithmetic and arithmetic on the fraction portion of floating point numbers as well as integer arithmetic on the exponent portion of floating point numbers.

The contents of shift register 52 are shifted in response to a SHFT EN shift enable signal generated by an OR gate 60. The OR gate 60 is energized by an SHFT shift signal from the control microword, or by an asserted signal from an AND gate 61. The AND gate is enabled by an M signal from an M flag 62 and is energized by an MSH (M shift) signal from the control microword. Thus, the array control unit may enable an unconditional shift by asserting the SH shift signal, or it may alternatively enable a shift conditioned on the state of the M flag 62 by asserting the MSH signal in the control microword.

The PE's operate in either a bit serial mode or a byte mode, in which a byte (eight bits) is processed during a control cycle. The PE operates in byte mode when a B_M byte mode signal from the control microword is asserted. When the B_M byte mode signal is asserted, shift register 52 shifts eight bits in a cycle, otherwise it shifts one bit in a cycle. Also, when in byte mode and shifting right, the shift register receives and stores eight bits in a cycle from its shift in input terminals (designated S/I in FIG. 4).

Finally, as described in detail below in connection with FIGS. 9A and 9B, shift register 52 also can shift in both directions, that is, toward the S/O output terminal or toward the S/I shift in input terminal. The shift direction is selected in response to a SHFT DIR shift direction signal from the control microword. The ability to shift the contents of the shift register toward the S/I input terminal is useful in floating point arithmetic, for example, particularly in normalization, that is, in removing leading zeroes, which are stored in the end of the shift register toward the S/I shift in input terminal.

The Boolean logic circuit 54 couples data signals to the full adder 51 from an eight-line data bus 58 or from one of the nearest neighbor PE's. Depending on the state of LGC FTN logic function signals, and if an LCM load constant mode signal from the control microword is not asserted, the Boolean logic circuit 54 may perform one of at least sixteen logical operations between an X flag 63 and signals from the data bus 58 or from the nearest neighbor PE's. If a logical operation is performed between the X flag 63 and the signals on the data bus 58, the logical operation is performed with respect to the signal on each line of the data bus 58 individually. For example, if an AND operation is to be performed, eight AND operations are actually performed, one between the X flag 63 and the signal on each of the lines of the data bus 58.

If the LCM load constant mode signal is asserted, the Boolean logic circuit 54 couples the LGC FTN logic function signals, D(1:0) direction signals and RD(1:0) data bus select field signals from the control microword to the address 51 as LOG OUT (7:0) logic out signals. (Note, as will be described later, the D(1:0) direction signals control the direction of grid communication and the RD(1:0) data bus select field signals control reading to data bus 58. Also, the memory defaults to reading out to the DATA bus when in LCM load constant mode.) In this way, the control microword may provide an eight bit constant, corresponding to the state of those signals, to all of the PE's in parallel.

In either bit-serial or byte mode, the carry latch 55 supplies a one bit CARRY signal to the full adder 51. The carry latch 55 latches the CARRY signal whenever the SHFT EN shift enable signal from OR gate 60 is asserted or load adder latch (lda) is asserted. A SET C set carry signal from the control microword, forces the CARRY IN output signal of the carry latch 55 to an asserted level, or a logical one value, and a CL C clear carry signal from the control microword, when asserted, forces the CARRY IN output signal to a negated level, or a logical zero value. The SET C set carry signal and CL C clear carry signal are useful for the same purpose as the CLO clear shift register output signal, namely, initial conditioning of the carry latch 55 prior to performing an arithmetic operation.

Furthermore, in either bit serial or byte mode, the full adder 51 generates eight ADD OUT (7:0) adder output signals and a C OUT carry out signal. The ADD OUT (7:0) adder output signals, after passing through a multiplexer 53, are coupled to the S/I shift in terminals of shift register 52 and to an input terminal of an adder latch 57. The C OUT carry out signal represents the carry signal from the high-order adder stage of the full adder 51, that is, the stage that generates the high-order ADD OUT (7) adder output signal. The other input to mulitplexer 53 is supplied by a signal line 238 from boolean logic box 54. The NR neighbor signal from the control microword and the ENR enable router signal after being OR'ed by OR gate 59 control which of the two inputs are selected by multiplexer 53. When either the NR neighbor signal or the ENR enable router signal are asserted, mulitplexer 53 selects the signal on line 238. As will become apparent later, this provides a direct signal path into the shift register for signals sent by other PE's, while the logic box is performing a parity check on the received data.

The C OUT signal and the C OUT (0) carry signal from the low order stage of the adder, which represents the carry from that stage, are coupled to a multiplexer 64 which, in response to the B_M byte mode signal from the control microword, couples one of the signals to an input of a second multiplexer 68. Multiplexer 68, in turn, in response to a LD C load carry signal from the control microword, selects either the CARRY OUT signal from multiplexer 64 or the LOG OUT (0) logic output (0) signal from Boolean logic circuit 54 for storage in the carry latch 55. If the LD C load carry signal is asserted, the multiplexer 68 is conditioned to couple the LOG OUT (0) logic output (0) signal to the carry latch 55 and the carry latch is enabled to latch the signal. This facilitates initializing the carry latch 55 to a known state through Boolean logic circuit 54. If, on the other hand, the LD C load carry signal is negated, the multiplexer 68 is conditioned to couple the CARRY OUT signal from multiplexer 64 to the input of the carry latch. The CARRY OUT signal is latched if the SHFT EN shift enable signal from OR gate 60 is asserted or if lda is asserted.

Thus, in byte mode, the carry latch 55 receives the carry from the high-order stage of the full adder 51, representing the carry from the high order stage of the byte. In bit-serial mode, the carry latch 55 receives the carry from the low-order stage of the adder. In bit-serial mode, the arithmetic operations in full adder 51 are essentially carried out in the low-order stage, as the signals from the higher-order stages are effectively ignored.

The M flag 62 is also conditioned by signals from the full adder 51 through a multiplexer 65. The multiplexer couples either the ADD OUT (0) signal from the full adder 51, or, if the B_M byte mode signal is asserted, the or of the ADD OUT (7:0) signals. The signal from the multiplexer is inverted by an inverter 66 and the result coupled to an input terminal of a second multiplexer 67. The multiplexer 67 also includes a second input terminal which receives the low-order signal from the Boolean logic circuit 54. If the SHFT DIR shift direction signal from the control microword is asserted, indicating that data in shift register 52 is shifted toward the shift in terminal S/I, the multiplexer 67 couples the complement of the high-order signal from shifter 52 (left shift) to the M flag 62 for storage in response to an LD M load M signal from the control microword. Otherwise, the M flag 62 is loaded from the signals from the Boolean logic circuit 54. An AND gate 70 couples the condition of the M flag 62 to data bus 58, particularly the low-order DATA (0) line thereof, in response to a RD M read M signal from the control microword.

If the M flag 62 is loaded from the shifter 52, it may be used, for example, in normalization during floating point arithmetic. In this operation, the fraction portion of the floating point number, which is stored in shift register 52, is shifted toward the S/I shift in terminal (that is, the high-order end) until the high-order stage contains the value "one". The shifting proceeds first by a sequence of byte shifts followed by a sequence of bit shifts until a one appears in the high-order stage of the shift register (to be described in greater detail below). In response to the total accumulation of bits that were shifted to normalize the contents of shift register 52, the exponent is decremented accordingly. Since different PE's in array 11 may require different numbers of shifts to normalize the contents of their respective shift registers 52, the shift operations then depend on the state of the MSH (M conditioned shift) signal from the control microword. Until a "one" reaches the high-order stage of shift register 52, the inverter 66 conditions the M flag 62 to be set (that is, stores the complement of the zero value from the shift register 52), and thus the M signal is asserted. Thus, the MSH signal enables shift register 52 to operate. However, when a "one" reaches the high-order stage of shift register 52, the inverter 66 conditions the M flag to be clear, negating the output M signal. When the MSH (M conditioned shift) signal from the control microword is asserted, the negated M signal disables the shift register 52. The M flag 62 can also be used for initial alignment of floating point numbers prior to an addition or subtraction in a similar manner.

Two additional flags are loaded from the low-order output signal from Boolean logic circuit 54, namely, a WRT memory write enable flag 71 and the TR transmit request flag 24. The WRT memory write enable flag 71 is loaded in response to an LD WRT load memory write enable signal from the control microword and the TR transmit request flag 24 is loaded in response to an LD TR load transmit request signal from the control microword. The WRT memory write enable flag 71 generates a WRT memory write signal which is AND'ed in an AND gate 500 with a WR write signal from the control microword to generate a WRT EN write enable signal associated with each of the memories 23 on the chip to control writing of data thereto.

When the routing network is in use and actually transferring data, the router control circuit 33 receives the data as a MSG IN message in signal. Contemporaneously, the ENR enable router signal is asserted. As is described in greater detail in U.S. patent application Ser. No. 07/121,563, filed Nov. 16, 1987, the first six bits received by the PE chip 20 identify the chip of the chip pair and PE on the chip which is to receive the message data. The router control circuit 33 receives the PE identification portion of the MSG IN messages in signals and asserts a SET R set receive flag signal which is associated with the identified PE 21. This enables the RCV receive flag 26 to be set, which results in the assertion of an RCV receive signal. A multiplexer 501 is enabled to couple the data portion of the MSG IN message in signals on line 31 as PE_SERIAL_IN serial input signal 35 into Boolean logic circuit 54. This enables the data from the data field of a message during a forward transfer through routing network 30 to be written to the shift register 52 from which it can then be read out and written into the memory 23 of the receiving PE 21.

If, on the other hand, the RVM reverse mode signal from the control microword is asserted, the multiplexer 501 is enabled to couple the signal on line 29, which normally carries the MSG OUT message out signal, to Boolean logic circuit 54 as the PE_SERIAL_IN serial input signal 35. In addition, a multiplexer 89 that is controlled by the RVM reverse mode signal and a driver 91 that is controlled by a READ_R read signal couple a TR EN transmit enable signal out onto the DATA(0) bus. As explained below, the TR EN transmit enable signal is asserted when the PE 21 is enabled to transmit during a forward transfer through routing network 30, and so identifies the recipient of data during a reverse transfer. The logic box 54 then loads the contents of the DATA(0) bus to the WRT memory write enable flag 71. After the received data has been loaded into the shift register 52, the WRT memory write enable flag 71 controls the writing of the contents of the shift register into the memory 23 of the recipient PE 21.

Finally, the router control circuit 33 also enables the memory 23 to store data when the routing network is in use but between messages by use of the SET R signal being read to the DATA (0) signal line and then written through logic box 54 to the WRT memory write enable flag 71 so as to control memory 23. This may occur when, for example, several messages are to be directed to a single PE by several PE's during one major message transfer cycle, and between messages the recipient PE is to perform a calculation on the just received data. As explained above, a major message transfer cycle comprises a plurality of minor message transfer cycles each initiated by the ENR enable router signal and terminated by a BND branch if not done signal. If the DONE signal is not asserted at the end of a minor message transfer cycle, some PE's have messages yet to transfer, and the BND signal from the control microword indicates that the array control unit will return to the beginning of the message transfer sequence. If a calculation is to be performed before the beginning of the next minor message transfer cycle, the ENR enable router signal is negated, but the BND branch if not done signal is delayed until the calculation is performed and the results written into memory 23. In this case, the memory 23, which is controlled by AND gate 500, is enabled if the WRT flag is set and the WR write signal from the control microword is asserted. However, the SET R set receive flag signal will be asserted only for those PE's which just received a message during the current minor message transfer cycle because the condition of the RCV flag 26 is normally coupled onto the data bus (when READ_R is asserted) and is stored in WRT flag 71.

The data output from memory 23 is coupled to a memory data output control circuit 73, described in greater detail in U.S. patent application Ser. No. 07/121,563. In brief, the memory data output control circuit 73 enables four memory modules 23, each normally associated with a separate PE, to be associated with one of the PE's in response to the conditions of the ADRS (11:10) high order address signals from the control microword. Thus, in one embodiment, in which the memory modules 23 each have on the order of 1 Kb (1024 bits), when either of the ADRS (11) or ADRS (10) high order address bits are asserted, one PE has an effective memory of 4 Kb (4096 bits), and the other PE's, which are normally associated with the PE's whose memory modules 23 are available to the one PE, are effectively disabled. This may be useful in several situations, including cases requiring more storage than is normally available to one PE. In addition, this may be useful in cases in which operations are performed in each PE on data in parallel, and then operations are performed serially by one PE using the data stored in all of the memory modules. Making the data in the memory modules directly available to the PE performing the operations serially avoids requiring the PE's to use message transfers to transfer the data to that PE.

The data from the memory data output control circuit 73 is stored in a read data latch 74 and coupled by the latch to transceiver (XCVR) 72. The transceiver 72 in turn couples the data onto data bus 58. The data bus 58 couples the data to the input terminal of a data bus parity circuit 79 and to the input terminal of Boolean logic circuit 54. The data bus parity circuit 79, described in greater detail later, generates a parity bit for data sent by that PE to another PE and can, under control of the microinstruction, place that parity bit on the DATA(0) line after the last bit of the data signal. A different circuit, namely, boolean logic circuit 54, checks the parity of data received by the PE. Because there are separate parity circuits for sending and receiving and because the data paths for sending and receiving data at the PE may also be isolated from each other, each PE may generate the parity bit for transmitted data while at the same time it is checking the parity of received data.

A multiplexer 76 selects a data signal from one of the neighboring PE's, in response to the condition of D(1:0) direction signals from the control microword. The selected signal is coupled to a Neighbor_In input line 81 of the boolean logic circuit 54. As will be described later in connection with FIG. 6, if the NR neighbor signal from the control microword is asserted, boolean logic circuit 54 selects the signal on its Neighbor_In input line 81 as the input signal which it processes.

Data is coupled to the memory modules 23 for storage as follows. Data from the data bus 58 is coupled through transceiver 72 to the data input terminals DI of the associated memory module 23. Depending on the condition of the ADRS (11:10) signals, the memory data output control circuit 73 may instead couple the data from the transceiver 72 to a memory module 23 normally associated with another PE for storage therein.

The data transmission portion of the nearest-neighbor message transfer mechanism, which was described above in connection with FIG. 3, is performed as follows. The DATA (0) signal from data bus 58 is connected to one terminal of a multiplexer 80. If neither the ROW signal nor the COL column signal from the control microword is asserted, the multiplexer 80 couples the DATA (0) signal to the input terminal of a demultiplexer 83. If the NR neighbor mode signal from the control microword is asserted, the demultiplexer 83 couples the DATA (0) signal to the PE determined by the D(1:0) direction signals.

If, on the other hand, either the ROW or the COL column signal from the control microword is asserted, the multiplexer 80 couples the output signal from an OR gate 82 to the demultiplexer 83. The OR gate 82 is enabled by the DATA (0) signal from data bus 58 or by the signal on the Neighbor_In input line 81. The signal transferred to the neighboring PE thus represents the logical OR of the signal from a neighboring PE received during the nearest neighbor transfer and the data signal on the low-order line of data bus 58. By this mechanism, the row and column data comparisons may be easily facilitated, which is useful in connection with finding minimum and maximum values along a row or column of PE's. If both the ROW and COL signals are asserted at once, the comparisons may be facilitated with respect to all of the PE's in the array 11 at one time.

Also depicted on FIG. 4 is circuitry associated with the PE chip's router control circuit 33 for enabling the PE to transfer messages over the routing network. As was noted above in connection with FIG. 2, the PE's on a chip are iteratively enabled to transfer messages over the routing network. Each PE receives an RTR OUT EN IN router out enable in signal which, when asserted, enables the PE to transmit message data signals over a common line 29. After the message is acknowledged, the PE generates an RTR OUT EN OUT router out enable out signal which is coupled to the next PE in line as that PE's RTR OUT EN IN router out enable in signal.

Specifically, when the TR transmit request flag 24 is set, a TR transmit request signal is asserted, which enables one input of an AND gate 94. When the PE's RTR OUT EN IN router out enable in signal is next asserted, an AND gate 94 asserts the TR EN transmit enable signal, which is coupled to one input of a multiplexer 93. If the RVM reverse mode signal is not asserted, indicating the transfer is in the forward direction through the routing network 30, the TR EN transmit enable signal enables a driver 95 to couple RD LTH (0) read latch output signals onto a line 90. If the RVM reverse mode signal is not asserted, an inverter 97 enables a driver 98 to couple the signal on line 90 onto line 29 as the MSG OUT message out signals.

On the other hand, if the RVM reverse mode signal from the control microword is asserted, indicating the transfer is in the reverse direction, the multiplexer couples the RCV receive signal from the receive flag 26 to control the driver 95. When the RCV signal is asserted, which occurs when the PE 21 is the intended recipient of a message, the driver 95 is enabled to couple the RD LTH (0) read latch signals onto line 90. Since the RVM reverse mode signal is asserted, driver 98 is disabled. However, a multiplexer 96 is enabled to couple the signal on line 90 onto line 31 for transfer in the reverse direction through routing network 30.

A message also includes an acknowledgement field during which the PE chip 20 containing the PE identified by the address transmits an acknowledgement signal. If the RVM reverse mode signal is not asserted, multiplexer 96 couples the ACK acknowledgement signal onto line 31 for transmission to the PE transmitting the message.

After a message operation has been completed, that is, after data has been transmitted in forward and reverse directions, as required by the control microwords from array control logic 10, the TR transmit request flags 24 in the transmitting PE's 21 are reset. When the TR transmit request flag 24 is reset, the TR transmit request signal is negated. Since the RTR OUT EN IN router out enable in signal is asserted, the AND gate 101 is energized to transmit the RTR OUT EN OUT router out enable out signal to the next PE in the hierarchy to enable that PE to engage in a message operation. If the PE's TR transmit request flag is not set when the RTR OUT EN IN router out enable in signal is asserted, its AND gate corresponding to AND gate 101 generates the asserted RTR OUT EN OUT signal for transmission to the next PE.

B. Status Signal Generation

As was noted above in the discussion regarding FIGS. 2 and 4, the array control unit 10 (FIG. 1) uses a DONE status signal transmitted over status bus 15 to determine if various operations have been completed by the PE's 21 in array 11 and to control further processing. The DONE status signal may be asserted when it is necessary to report status or error information to the array control unit. For example, as will be described shortly, it is used to alert the array control unit 10 that a parity bit error has occurred in at least one of the PE's in the grid. In that case, the array control unit 10 typically responds to an asserted DONE signal by invoking a service routine to identify the particular processing elements in that grid that generated the error condition and then report the condition to the user. The service routine locates the source of the error report by simply looking at the status of the M bit in each of the processing elements until the processing elements which generated the error report are found. The DONE status signal is also used to determine whether all messages that are being sent over the router network have reached their destination. If the DONE status signal remains asserted after a message cycle is completed, indicating that not all messages have been received, the array control unit 10 sequences through the appropriate set of microinstructions to send a new message cycle. That process is repeated until the DONE status signal is deasserted, indicating that all messages have been received.

Figure 5:
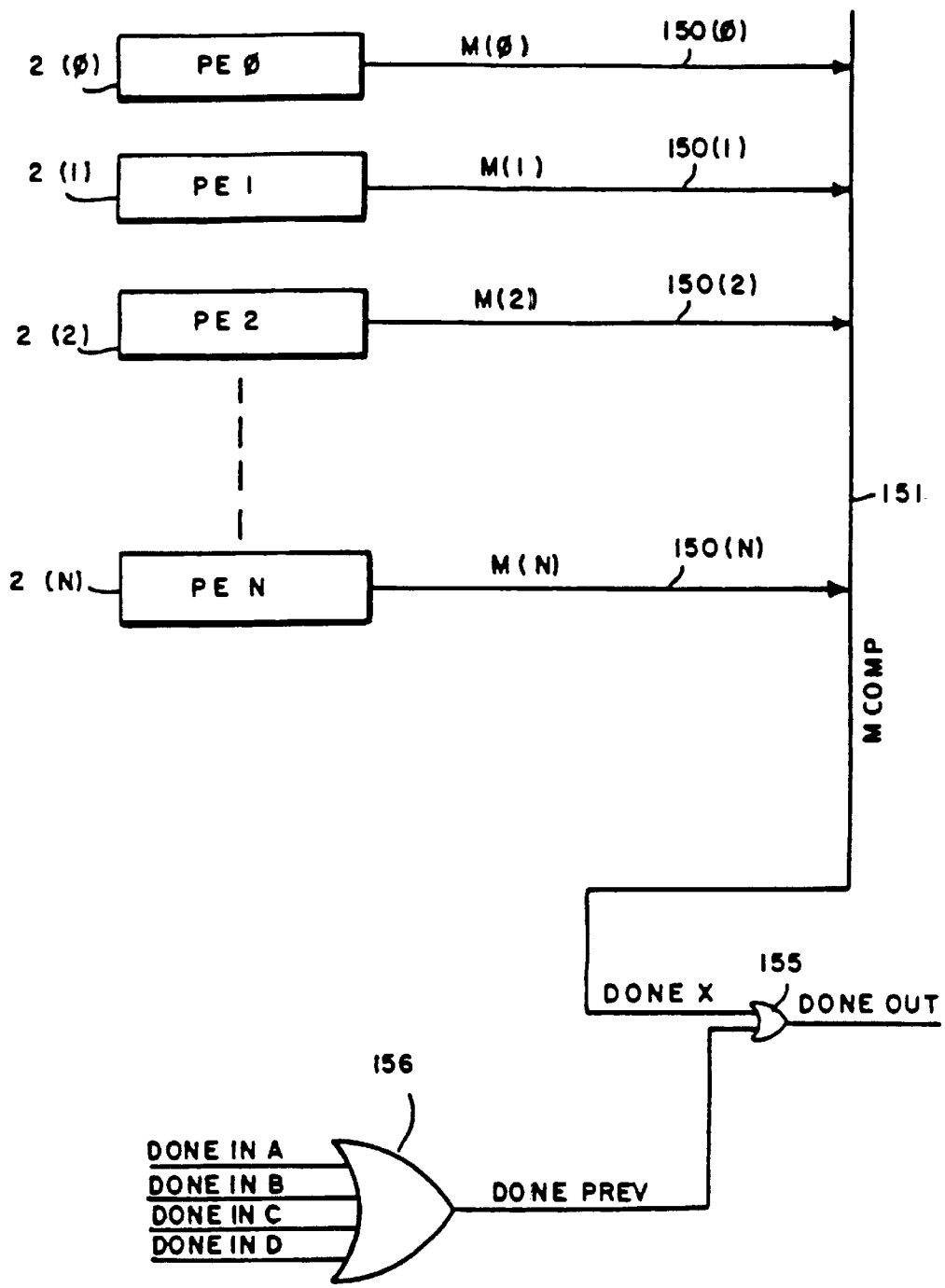
FIG. 5 is a block diagram depicting the generation of various status signals on each processor chip used by the array control unit depicted in FIG. 1.

FIG. 5 depicts circuitry within a PE chip 20 for generating a DONE OUT signal which is used by array 11 (FIG. 1) in connection with generating the DONE status signal. With reference to FIG. 5, each PE 21(0) through 21(N) on the PE chip 20 has extending therefrom a wire 150(0) through 150(N) which carries signals M(0) through M(N). The asserted or negated condition of each signal M(0) through M(N) corresponds to the set or cleared condition of the PE's M flag 62 (FIG. 4). Thus, if a PE's M flag 62 is set, the PE's M (x) signal ("x" a value from zero to N) is asserted, otherwise the M(x) signal is negated.

All of wires 150(0) through 150(N) are connected to a common wire 151 in a wired-OR configuration. Wire 151 carries an M COMP composite "M" signal whose asserted or negated condition depends on the conditions of the M(0) through M(N) signals from all of the PE's on the chip. Thus, if the M flag 62 (FIG. 4) of any of PE's 21(0) through 21(N) is set, the PE's corresponding M(x) signal is asserted, and the M COMP signal is asserted. If the M flags 62 of all of PE's 21(0) through 21(N) are cleared, all of the M(0) through M(N) signals will be negated, and the M COMP signal will be negated.

With reference to FIG. 5, line 151 is coupled to one input terminal of an OR gate 155. If the signal on line 151 is asserted, the DONE X signal is also asserted, otherwise, the DONE X signal is negated. If the DONE X signal is asserted, the OR gate 155 also asserts the DONE OUT signal.

The OR gate 155 has a second input terminal which receives a DONE PREV done previous signal from an OR gate 156. OR gate 156, in turn receives as input signals DONE IN A through DONE IN D signals, each of which corresponds to a DONE OUT signal from another PE chip. The DONE OUT signal from the PE chip 20 depicted in FIG. 5 may also be directed as an input signal to an OR gate corresponding to OR gate 156 on another PE chip. The resulting connection, an "OR" tree, results in one DONE OUT signal from one PE which is coupled to array control unit 10 as the DONE signal. Thus, when the DONE signal is in a low voltage condition, all of the M COMP composite M signals in all of the PE chips are negated, indicating that all of the M flags 62 are cleared. Thus, the operation which was governed by the M flags 62 in the PE's has been completed.

C. Parity Checking/Generating Circuits

Figure 6:
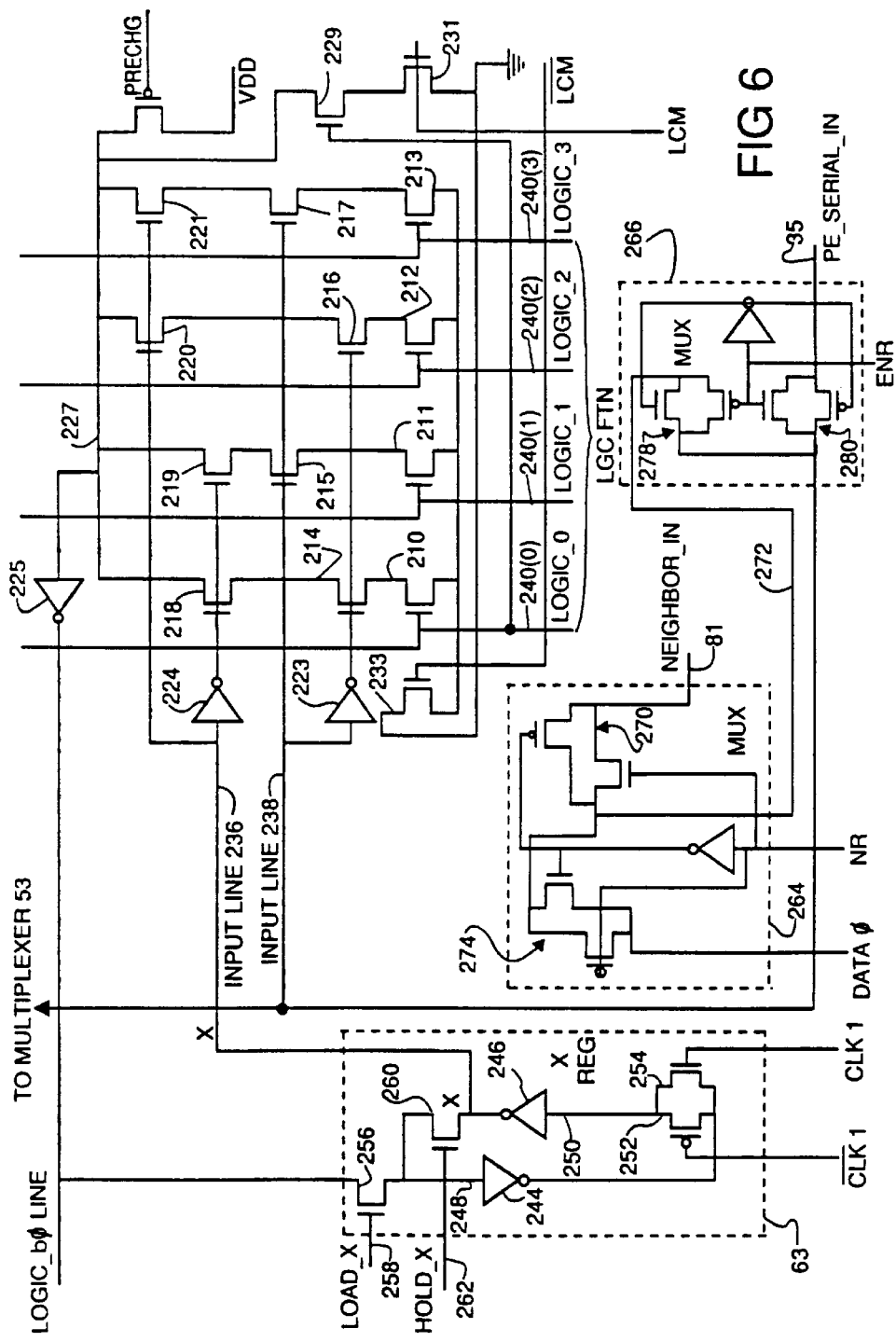
FIG. 6 is a circuit diagram of one stage of the boolean logic circuit.

As noted above, boolean logic circuit 54 checks the parity of data sent by another PE as it is being received. The structure and operation of the logic box are as follows. Logic box 54 includes eight stages, one for each of the eight bits of data which the logic box can process at any one time. Referring to FIG. 6, the first stage generates the zeroth bit of the LOG OUT(7:0) signal, i.e., the signal which appears on logic_b0 line 8(0). Since the structure and operation of all stages can be understood through a description of the first stage, only the first stage is shown. The logic portion of the first stage includes an array of transistors 210 through 221 and three inverters 223, 224, and 225. The logic portion performs a selected logical operation between an X signal on a first input line 236 and another input signal on a second input line 238. The particular logic function which is performed by the logic box is determined by the particular LGC FTN signal that is asserted on logic lines 240(0:3). The result of the logic operation appears at the output of inverter 225.

X register 63 (also see FIG. 4), implemented as a latch employing a master-slave configuration, stores the X signal which is passed to all stages of the logic box over input line 236. X register 63 includes two inverters 244 and 246. The input of inverter 244 represents a master node 248 and the input to the other inverter 246 represents a slave node 250. The output of inverter 244 is coupled to slave node 250 of inverter 246 through a pair of complementary pass transistors 252 and 254, whose input gates are controlled, respectively, by the CLK1 clock signal and its complement, the $\overline{CLK1}$ clock signal. At any given time, both of transistors 252 and 254 are either on or off. When both transistors are on, they transfer the inverse of the signal stored at master node 248 to slave node 250. When both transistors are off, they allow slave node 250 to drive the input line 236 of the logic box while another value for X is being stored at master node 248 for use during the next control cycle.

A transistor 256 which is controlled by a LOAD_X load signal 258 provides the mechanism for setting the stored X bit to a desired value. When LOAD_X load signal 258, which drives the gate of transistor 256, is asserted, transistor 256 couples the signal on logic_b0 line 8(0) to the master node 248. Thus, the value of the signal on logic_b0 line 8(0) is stored at master mode 248. Another pass transistor 260 which is controlled by a HOLD_X hold signal 262 serves to refresh, and thereby hold, the signal value stored at the master node 248. It does this by coupling the output of inverter 246 (i.e., the inverted value of the signal stored at slave node 250) to master node 248 when the HOLD_X hold signal 262 is asserted.

The signal which is passed to the second input line 238 of the first stage of the logic box 54 is selected by two MUX's 264 and 266. MUX's 264 and 266 select one of three different signal lines as the source of the input signal. The three signal lines include the DATA(0) line of the internal data bus, a NEIGHBOR_IN data line 81 which carries received data from a neighboring processor in the grid array (i.e., via a nearest neighbor transfer), and the PE_SERIAL_IN signal line 35 which carries data signals that are sent to the PE over the router network (i.e., via a random transfer) (also see FIG. 4).

The value of the NR neighbor signal controls the operation of MUX 264 by determining which of two sets of complimentary transistor pairs 270 and 274 is turned on. If the NR neighbor signal is asserted, transistor pair 270 is turned on and transistor pair 274 is turned off, thereby passing the signal on the NEIGHBOR_IN data line 81 to a first input line 272 of MUX 266. On the other hand, if the NR neighbor signal is deasserted, the signal on the DATA(0) line is passed to input line 272 of MUX 266. An ENR router enable signal controls MUX 266 in a similar manner, i.e., by determining which of two sets of complimentary transistor pairs 278 and 280 is turned on. If the ENR enable router signal is asserted, transistor pair 278 is turned off and transistor pair 280 is turned on, thereby passing the signal on the PE_SERIAL_IN line 35 to input line 238 of the logic box. On the other hand, if the ENR router enable signal is deasserted, the signal on the input line 272 from MUX 264 line is passed to input line 238 of the logic box.

Note that the signal on input line 238 is also directed to shift register 52. When the logic box is being used to perform parity checking on a received signal, as will be described shortly, this signal path enables the received data go directly into the shift register.

With the NR neighbor signal asserted and the ENR enable router signal deasserted, grid communications (i.e., a nearest neighbor transfer) supplies the data for the logic box. If the ENR enable router signal is asserted, the router supplies the data for the logic box. If the NR neighbor signal and the ENR enable router signal are both deasserted, the internal data bus supplies the data to the logic box.

When the PE receives data from another processor, the logic box, depending on the microinstruction, can perform an exclusive-OR (XOR) operation on the received data to check the parity of the incoming data. Prior the receiving the data, the microword sets the LGC FTN signal (which is the signal on the signal lines labelled logic_0 through logic_3) to 0 0 0 0 to place a zero signal on the logic_b0 line. That zero value is then loaded into the X register 63 by asserting the LOAD_X load signal 258. After initializing the state of the X register to zero, the LGC FTN signal is set to 0 1 1 0 to set up the logic box for performing an XOR operation on the received data. As the data is received over the selected input line (e.g., NEIGHBOR_IN data line 81), each bit of the received signal passes into the logic box over input line 238 where it is XORed with the X bit signal on input line 236 to produce a resulting signal on logic_b0 signal line 8(0). After the X bit has been XORed with the first bit of the data signal, the LOAD_X load signal 258 is asserted thereby loading the resulting value into the master node 248 of the X register 63 and replacing the previous value for the X bit with a new value.

The same process is repeated for each successive data bit received at the logic box, XORing the received bit with the last value for the X bit. After all data has been received and processed in this manner, the parity bit is then processed. If even parity is used, the final value of the X bit should be zero. The value of the X bit which exists after receiving the parity bit is sent to the OR tree (see FIG. 5) via the M bit. If the X bit is non-zero, indicating that the parity of the received data was in error, the OR'ed signal on the OR tree is asserted thereby indicating that a parity bit error occurred somewhere in the processor array. At that point, the array control unit 10 (FIG. 1) invokes a service routine to identify which of the processors experienced the parity bit error.

Note that when the logic box 54 is performing a parity check on received data, either the NR neighbor signal is asserted, if in the nearest neighbor mode, or the ENR enable router signal is asserted, if in the random transfer mode. In either case, the received signal, which appears on line 238, is sent directly into the shift register through multiplexer 53 at the output of full adder 51.

Also shown in FIG. 6 is the circuitry which implements the load constant mode mentioned earlier. Recall that the load constant mode operates by placing the LGC FTN logic function signal onto the output lines of logic box 54. Thus, a constant (represented by the LGC FTN logic function signal) can be broadcast to all of the processors in the array. The relevant circuitry in FIG. 6 includes transistors 229, 231 and 233. Transistors 229 and 231 are connected in series between the ground and node 227, which is at the input of inverter 225. A LCM load constant mode signal controls transistor 231 and the signal on the logic_0 line controls transistor 229. Transistor 233 serves to enable/disable the logic array (i.e., transistors 210–221) by coupling/decoupling the array to ground in response to the complement of the LCM load constant mode signal (i.e., the $\overline{\text{LCM}}$ complementary load constant mode signal). If the LCM load constant mode signal is deasserted (i.e., the $\overline{\text{LCM}}$ signal is asserted), transistor 233 is on and the logic array determines the signal which appears at node 227. Whereas, if the LCM load constant mode signal is asserted (i.e., the $\overline{\text{LCM}}$ signal is deasserted), transistor 233 is off, transistor 231 is on and transistor 229 (i.e., the signal on the logic_0 line) determines the signal which appears at node 227.

Figure 7:
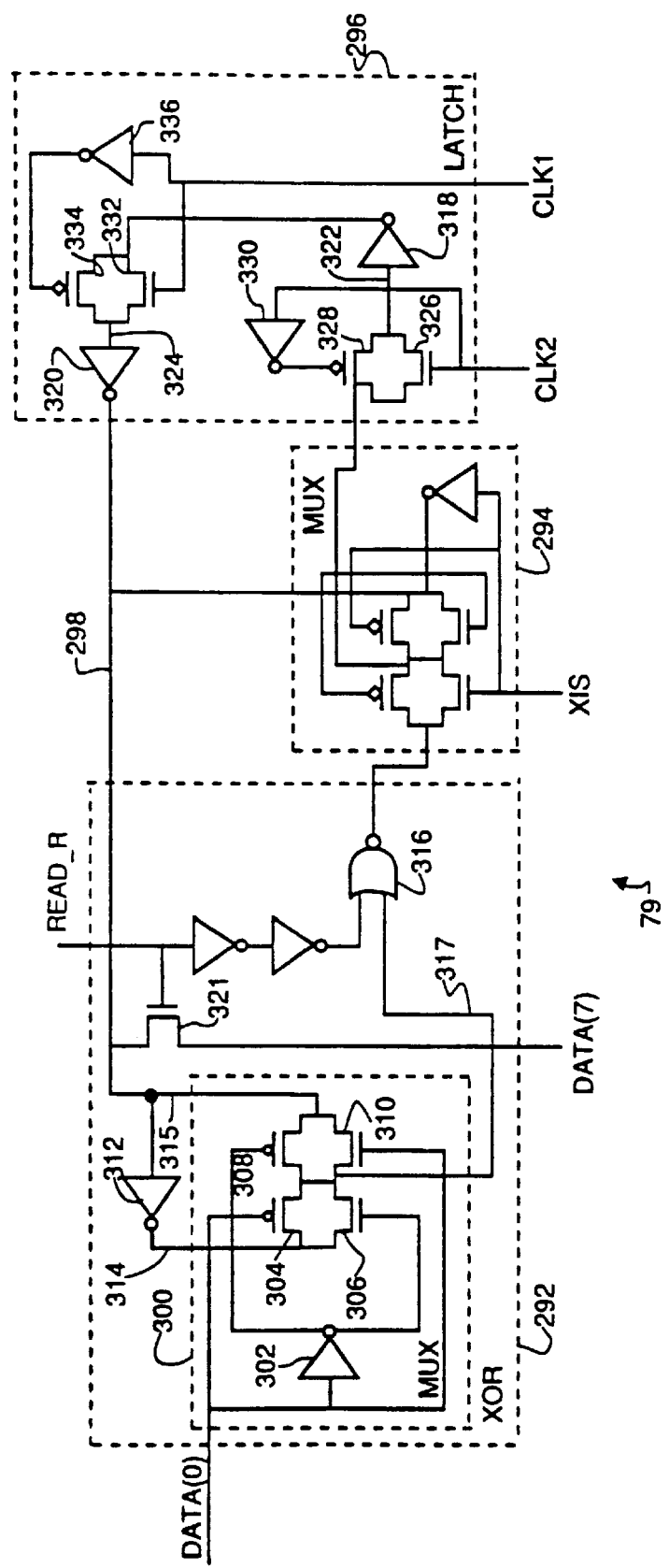
FIG. 7 is a circuit diagram of the data bus parity circuit.

As mentioned earlier, each PE also includes a data bus parity circuit 79 which enables the PE to generate the parity bit for outgoing data at the same time that the boolean logic circuit 54 is checking the parity of incoming data. Referring to FIG. 7, the data bus parity circuit 79 includes an XOR circuit 292, a MUX 294 and a dynamic latch 296. The XOR circuit 292 exclusive-OR's (i.e., XOR's) the signal on the DATA(0) signal line with a second signal that is supplied over an output line 298 from dynamic latch 296.

The XOR circuit 22 includes a MUX 300 and an inverter 312. The DATA(0) signal controls the operation of MUX 300, causing it to select the input signal appearing at one of two input terminals 314 and 315 and pass that signal to an output line 317. The output from the dynamic latch 296 (appearing on output line 298) drives the input terminal 315 of the MUX 300 and the input of inverter 312. The output of inverter 312 drives terminal 314 of the MUX 300.

Inside MUX 300 there is an inverter 302 and two sets of complimentary transistor pairs 304–306 and 308–310 that are connected in series. Transistors 306 and 310 are N-type transistors and transistors 304 and 308 are P-type transistors. The DATA(0) signal drives the gates of transistors 304 and 310 and the complement of the DATA(0) signal (i.e., the output of inverter 302) drives the gates of transistors 306 and 308. A HIGH DATA(0) signal turns on transistors 308 and 310 and turns off transistors 304 and 306, thereby selecting the input signal of inverter 312 as the output signal of MUX 300. A LOW DATA(0) signal turns on transistors 304 and 306 and turns off transistors 308 and 310, thereby selecting the output signal from inverter 512 as the output signal of MUX 300.

Output signal from MUX 300 passes to one input of a two-input NOR gate 316. The other input of NOR gate 316 is controlled by the READ_R read signal which is used to initialize the latch 296 (recall as earlier described that the READ_R read signal also controls the reading of the TR EN transmit enable signal onto the DATA(0) bus during reverse mode operation). As will become more apparent shortly, when the READ_R read signal is asserted, the output of NOR gate 316 is forced to zero and thus a zero value can be stored in dynamic latch 296. The output of NOR gate 316 drives one input of MUX 294. The output from dynamic latch 296 drives the other input of MUX 294.

Note that the READ_R read signal also drives the gate of a transistor 321 which couples the signal on output line 298 of dynamic latch 296 onto the DATA(7) line. With the data on the DATA(7) line, a byte read to memory 23 is performed and then the bit(7) of the byte of data that was just read to memory is read out onto the DATA(0) line. In this manner, the parity bit is placed on the DATA(0) line at the end of the group of data bits that are being transmitted to another PE.

The construction and operation of MUX 294 is similar to that of MUX 300. MUX 294, which is controlled by an XIS x-invert shifter signal, selects which signal is passed to the input of dynamic latch 296. MUX 294 selects either the output of the XOR circuit 292 or the output signal from the dynamic latch itself. If the XIS x-invert shifter signal is asserted, the dynamic latch 296 receives new data from the XOR circuit 292. If the XIS x-invert shifter signal is deasserted, the data bit stored within the dynamic latch 296 circulates within the latch.

Dynamic latch 296 employs a master-slave design. It includes two inverters 318 and 320. The input of inverter 318 represents a master node 322 and the input of inverter 320 represents a slave node 324. A complimentary pair of transistors 326 and 328 loads the output signal from MUX 294 into master node 322 in response to a CLK1 clock signal (i.e., one of the phases of the three-phased clock signal that is generated in the system). The gates of transistors 326 and 328 are connected together through an inverter 330 and the CLK2 clock signal drives the gate of transistor 326. With this configuration both transistors 326 and 328 are either on or off depending upon the CLK2 clock signal. A second complimentary pair of transistors 332 and 334 loads the output signal from inverter 318 into slave node 324 in response to a CLK1 clock signal. The gates of transistors 332 and 334 are connected together through an inverter 336 and the CLK1 clock signal drives the gate of transistor 332. Thus, both transistors 332 and 334 are either on or off depending upon the CLK1 clock signal.

Note that the control cycle has three distinct phases, namely, CLK1, PRECHG, and CLK2. (The PRECH phase is typically used to precharge various lines in the processing element such as in the shift register and the adder V bit circuit, as will be discussed elsewhere.) During the last phase of the control cycle (i.e., CLK2), a data bit from MUX 294 is loaded into master node 322. During the first phase of the next control cycle (i.e., CLK1), the output of inverter 318 (i.e., the complement of the signal stored at master node 322) is transferred to slave node 324 thereby allowing master node 322 to store new data.

Data bus parity circuit 79 works as follows. For the purpose of illustration, it will be assumed that the data signal input sequence is 0 1 1. Before processing the data to be transmitted, the READ_R read signal is asserted to initialize dynamic latch 396 and the XIS x-invert shifter signal is asserted. The asserted READ_R read signal at one input of NOR gate 316 forces its output to go LOW. Since the XIS x-invert shifter signal is also asserted, MUX 294 passes the output of NOR gate 316 to the input of dynamic latch 296. Thus, when the CLK2 clock signal occurs, a LOW signal value (or zero bit value) is stored at master node 322. In response to the CLK1 clock signal, dynamic latch 296 transfers the complement of the stored value at master node 322 to slave node 324, thereby forcing the output of dynamic latch 296 (and thus, the input of XOR circuit 292) to LOW.

The XIS x-invert shifter signal remains asserted throughout the period of data transmission. Thus, MUX 292 always passes the output of NOR gate 316 to the input of dynamic latch 296. During the data transmission, the READ-R read signal is deasserted (i.e., LOW). Thus, throughout this period, the output of NOR gate 316 is the complement of the value that appears on line 317 from XOR circuit 300.

The first bit of the DATA(0) signal (i.e., the ZERO bit) turns on transistor pair 304 and 306, thereby selecting the output of inverter 312 as the input signal to NOR gate 316. Since the signal on output line 298 is LOW, the output of inverter 312 is HIGH. Since the READ_R read signal is deasserted, the output of NOR gate 316 remains LOW. Thus, the value stored at master node 322 of dynamic latch 296 in response to the CLK1 clock signal is also LOW. At the start of the next control cycle, after the stored data value has been transferred to slave node 324, the signal on line 298 remains LOW.

The second bit of the DATA(0) signal (i.e., a ONE bit) turns off transistor pair 304 and 306 and turns on transistor pair 308 and 310, thereby selecting the signal on line 298 as the output of MUX 300. Since both inputs of NOR gate 316 are now LOW, its output is forced HIGH. Thus, the value stored in master node 322 and the output signal on line 298 are both HIGH at the beginning of the next control cycle. Thus, the next bit of the data signal will be exclusive OR'ed with a ONE bit.

The third bit of the DATA(0) signal (i.e., another ONE bit) causes MUX 300 to continue to select line 298 as the source of the signal which drives NOR gate 316. Since the value on line 298 is now HIGH, the output of NOR gate 316 is forced LOW. Thus, at the beginning of the next control cycle, the signal on line 298 is also forced to LOW.

By now it should be apparent, that the signal on line 298 from dynamic latch 296 keeps track of the number of one bits in the DATA(0) signal. A ONE on line 298 indicates that the number of ONE bits in the DATA(0) signal thus far has been odd; and a ZERO on line 298 indicates that the number of ONE bits has been even.

Assuming that even parity is used, at the end of the sequence of data bits on the DATA(0) line, the value of the parity bit which must added to the end of the transmitted signal is the value of the signal which sits on line 298 at the output of dynamic latch 296. To add the parity bit to the transmitted data bit stream, the READ_R read signal is asserted so as to read the value of the signal on line 298 onto the DATA(7) signal line, from which it is read into memory and then onto the DATA(0) signal line.

D. Bidirectional Byte/Bit Shift Register

Figure 8:
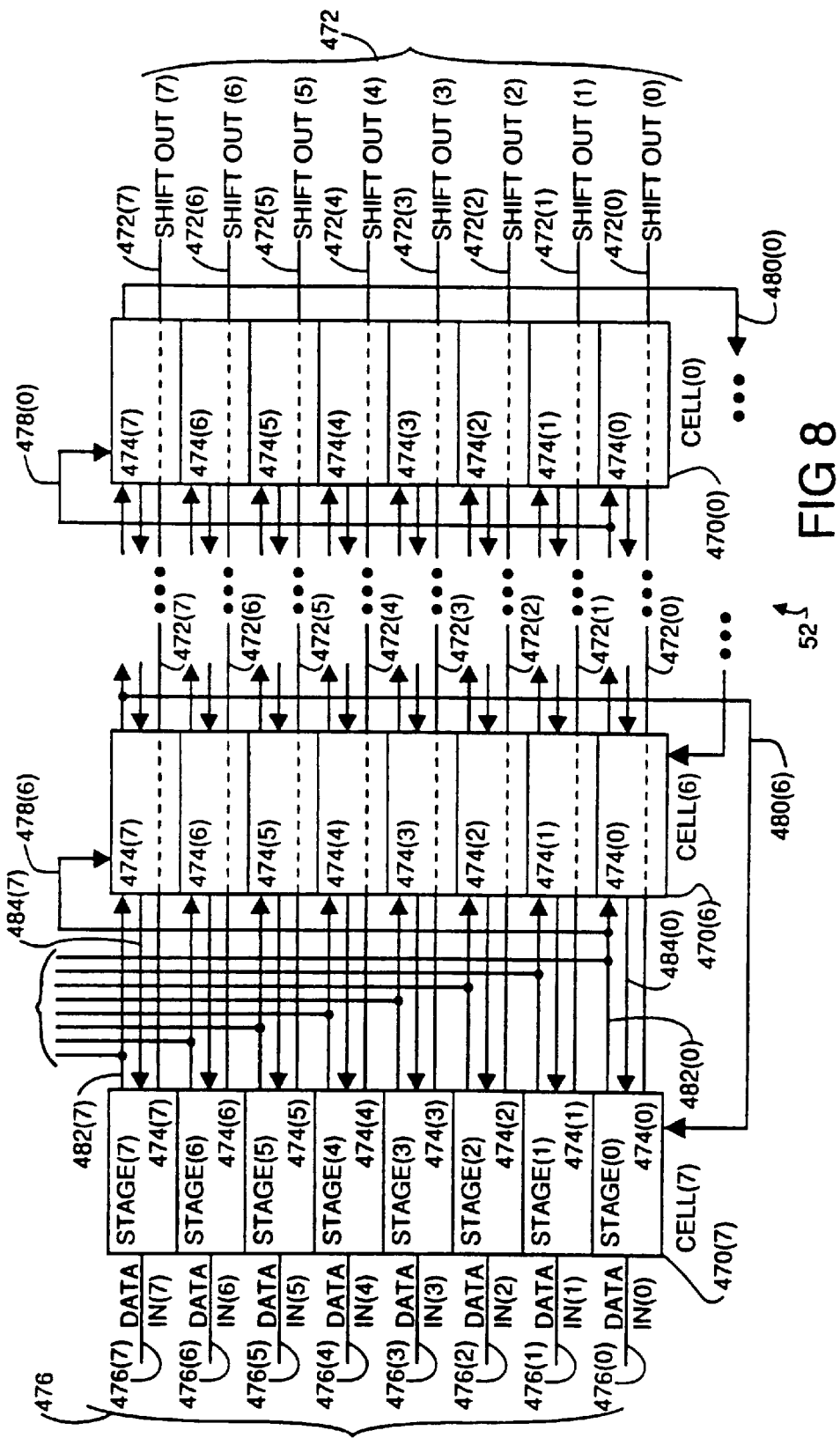
FIG. 8 is a block diagram of the shift register.

Referring to FIG. 8, shift register 52 (see FIG. 4) is a bidirectional byte/bit shift register that includes eight cells 470(0–7), also labelled Cell(0) through Cell(7). Cell(0) through Cell(7) are connected in parallel to a bus 472 made up of eight signal lines 472(0–7). Output signals from shift register 52 are shifted out over signal lines 472(0–7) as SHIFT OUT(0–7) output signals, respectively. Each cell includes eight stages 474(0–7), also identified as Stage(0) through Stage(7) in FIG. 8. Each of the eight stages 474 (0–7) of a cell is connected to a corresponding different one of signal lines 472(0–7) and it stores a single bit of stored data. Data may be loaded into stages 474(0–7) of cell(7) a byte at a time over input lines 476(0–7) as DATA-IN(0–7) input signals, respectively.

Shift register 52 has four modes of operation, namely, a bit shift right mode, a bit shift left mode, a byte shift right mode and a byte shift left mode. During the right and left bit shift modes, data shifts through the shift register one stage at a time over a data path which links all of the stages of the cells together in a serial fashion. For bit right shifts, stage(0) of one cell(X) is linked to stage(7) of cell(X-1) by a transfer line 478(X-1), where X is an index which may take on any integer value from 1 through 7. For bit left shifts, stage(7) of one cell(Y) is linked to stage(0) of cell(Y+1) by a transfer line 480(Y), where Y is an integer index which may take any integer value from 0 through 6. Thus, for example, if the bit shift right mode is selected, the data in the stage(0) of cell(7) is passed to the right to stage(7) of neighboring cell(6) over transfer line 478(6), and similarly for each of the other cells. On the other hand, if the bit shift left mode is selected, the data in the stage(7) of cell(0) is passed to the left to stage(0) of the neighboring cell(1) over transfer line 480(0), and so on for the rest of the cells.

During the right and left byte shift modes the contents of the stages(0–7) of a given cell are shifted in parallel to corresponding stages(0–7) of the neighboring cell, either on the left or right depending upon the direction of shifting. Between cell(7) and cell(6), right shift lines 482(0–7) provide a path for shifting data one byte to the right from cell(7) to cell(6). Similar right shift lines exist for cell(6) through cell(1). Also between cell(6) and cell(7), left shift lines 484(0–7) provide a path for shifting data one byte to the left from cell(6) to cell(7). Similar left shift lines exist for cell(5) through cell(0).

The length of the shift register may be selected by a control signal (not shown in FIG. 8). As described below, the control signal electrically couples a selected one of CELLS (0–7) to data bus 472. The selected cell then delivers the SHIFT OUT data to data bus 472.

Figure 9A:
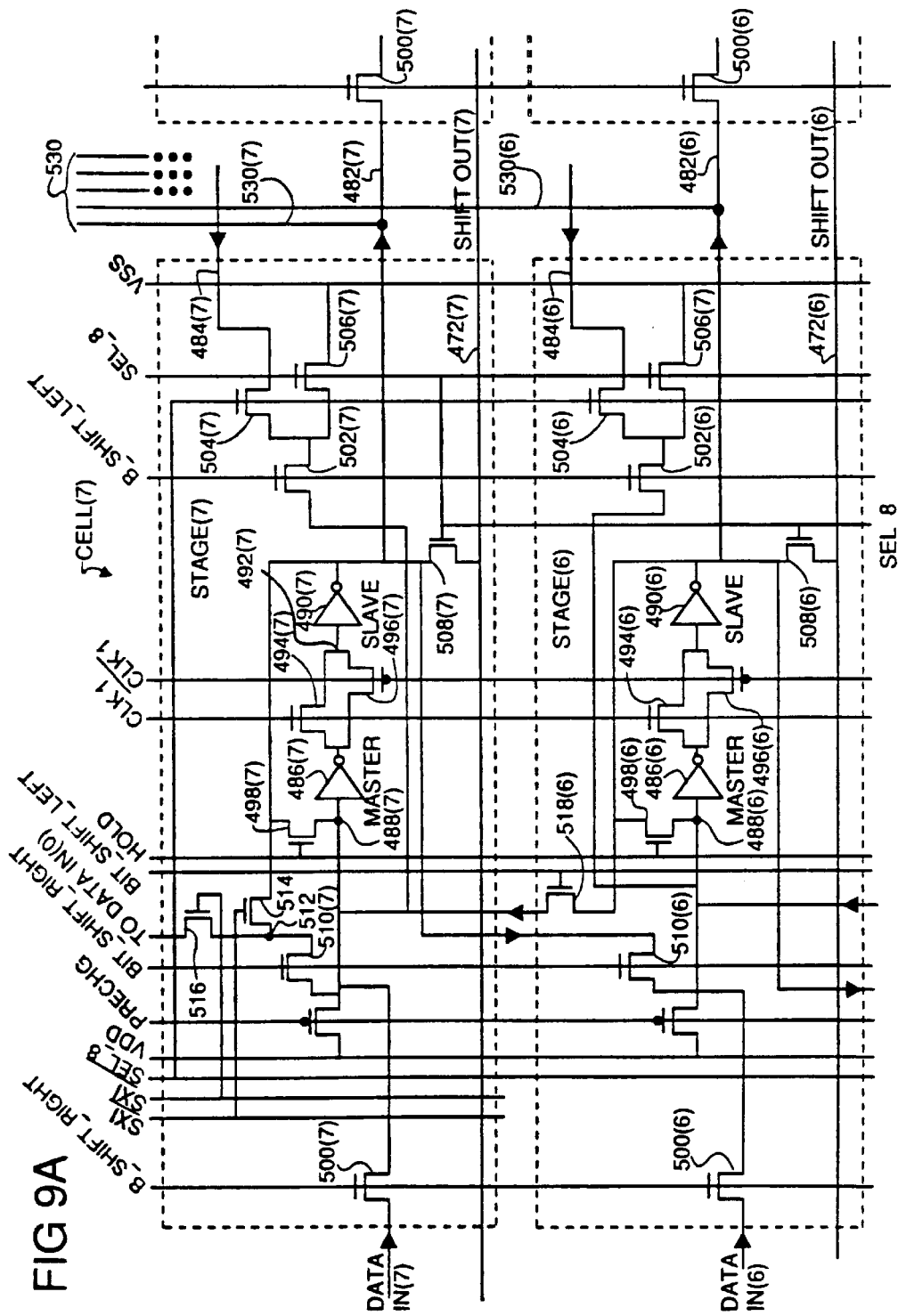
FIGS. 9A and 9B show the circuit diagram of three stages of one cell of the shift register.
Figure 9B:
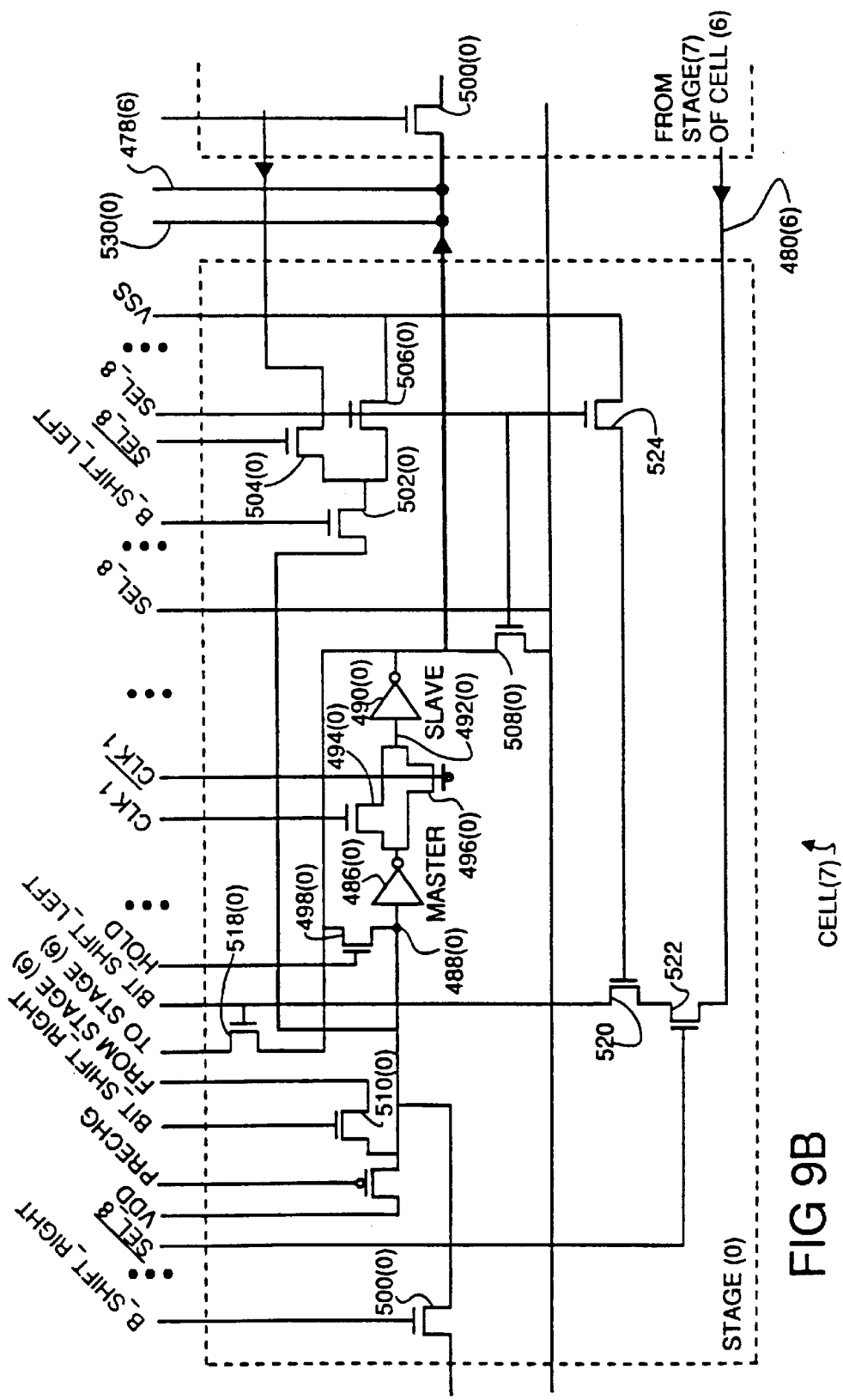

Stage(7), stage(6) and stage (0) of cell(7) are shown in greater detail in FIGS. 9A and 9B. Each stage includes a storage unit that employs a master-slave design. In stage(7), for example, the storage unit includes a first inverter 486(7) having an input terminal representing a master node 488(7) and it includes a second inverter 490(7) having an input terminal representing a slave node 492(7). The output of inverter 486(7) is electrically coupled to slave node 492(7) at the input of inverter 490(7) through a complimentary pair of transistors 494(7) and 496(7) that are controlled by CLK1 and $\overline{\text{CLK1}}$ clock signals, respectively. When CLK1 clock signal is asserted (and thus $\overline{\text{CLK1}}$ clock signal is deasserted), the inverted value of the bit stored at master node 488(7) is passed to slave node 492(7).

A transistor 498(7), whose gate is controlled by a HOLD signal, provides a feedback path from the output of inverter 490(7) to master node 488(7) at the input of inverter 486(7), thereby enabling the stored data bit to circulate within the storage unit so as to retain its value over more than one control cycle. When the HOLD signal is asserted, transistor 498(7) is enabled thereby completing the feedback path from the output of inverter 490(7) back to master node 488(7).

In stage(7) of Cell(7), a pass transistor 500(7) controls whether or not the DATA_IN(7) signal on input line 476(7) can be loaded into master node 488(7) of the storage unit in that stage. Each of the other stages in Cell(7) (and for that matter, each of the stages in the other cells) contains a corresponding pass transistor which serves a similar purpose. In the following discussion, the other transistors corresponding to transistor 500(7) are designated 500(0) through 500(6), though only transistors 500(6) and 500(0) are shown in FIGS. 9A and 9B. The conduction states of transistors 500(0–7) are established by a B_SHIFT_RIGHT byte shift right signal. If the B-SHIFT-RIGHT byte shift right signal is asserted, transistor 500(7), and the corresponding transistors in the other stages, are turned on thereby enabling a byte of data to be shifted into the cell from the left. When the B_SHIFT_RIGHT byte shift right signal is deasserted, transistors 500(0–7) are turned off, thereby disabling the signal path for loading a data byte into the cell.

While data is being loaded into the master node of the storage unit via the DATA_IN(0–7) signals over lines 476(0–7), the data which is already in the cell and which is held at the slave node of the storage unit passes to the next cell to the right, e.g. from Cell(7) to Cell(6). In the case of stage(7), the output of inverter 490(7) is coupled to input line 482(7) of the neighboring stage(7) in cell(6). The B_RIGHT_SHIFT byte shift right signal enables a transistor 500(7) in stage (7) of cell(6) that passes the signal on input line 482(7) to the master node within that stage. Since the construction of each of the cells is basically the same, the data byte stored in the eight stages of each cell is transferred in a similar manner to the corresponding eight stages of the neighboring cell to the right.

A byte shift left of data through the shift register uses different signal paths from those used for byte right shifts of data. Again, with reference to stage (7) of cell(7), the data path for byte left shifts is established by transistors 502(7), 504(7), and 506(7). Transistors 504(7) and 506(7) form part of circuitry which establishes the length of the variable length shift register and their operation will be described shortly. Transistor 502(7), which is controlled by a B_SHIFT_LEFT byte shift left signal, connects master node 488(7) of inverter 486(7) of the storage unit to the data path which supplies the left shifted data byte from the cell to the right of the current cell. In byte shift left mode, the B_SHIFT_LEFT byte shift left signal is asserted, transistor 502(7) is turned on and the data path into the master node is either through transistor 506(7) or through transistor 504(7), depending on the condition of the signals which control the gates of those transistors.

A SEL8 cell select signal controls the gate of transistor 506(7) and a $\overline{SEL8}$ cell select signal (i.e., the complement of the SEL8 cell select signal) controls the gate of transistor 504(7). When the SEL8 cell select signal is asserted, the $\overline{SEL8}$ cell select signal is deasserted and vice versa. Thus, at any given time one of transistors 504(7) and 506(7) is on while the other is off. If transistor 504(7) is on, output signal line 484(7) which carries the output of the storage unit in stage(7) of the neighboring cell to the right (i.e., cell(6)) supplies the data bit to master node 488(7) of stage(7) of cell(7). If transistor 506(7) is on, the $V_{SS}$ supply, which is at ground, supplies the data bit of LOW value, i.e., a zero bit, to master node 488(7).

Also note that if transistor 506(7) is on (i.e., the SEL8 cell select signal is asserted), cell(7) becomes the last cell of the shift register thereby setting the length of the shift register to 8 bits, the length of cell(7). The SEL8 cell select signal turns on a transistor 508(7) which couples the output of inverter 490(7) onto data bus line 472(7) to generate the SHIFT_OUT(7) signal from the shift register. When the SEL8 cell select signal is deasserted, transistor 508(7) is turned off, thereby decoupling the stage from data bus 472.

Note that there is SEL cell select signal corresponding to the SEL8 cell select signal which controls each of the cells of the shift register. Since only one of the cells is selected at any given time to place its signal onto data bus 472, only the appropriate one of the SEL cell select signals will be asserted at any given time.

If a byte shift left occurs while the SEL8 cell select signal is asserted, the data which is shifted into cell(7) is eight zeros.

The signal path for shifting data to the right one bit through cell(7) is established by transistors 510(0)–510(7), of which only transistors 510(7), 510(6) and 510(0) are shown in FIGS. 9A and 9B. A BIT_SHIFT_RIGHT bit shift right signal controls the state of these transistors. If BIT_SHIFT_RIGHT bit shift right signal is asserted, transistors 510(0)–510(7) are turned on; whereas, if it is deasserted, they are turned off. In stage(7), if transistor 510(7) is turned on, it couples the signal at a node 512 to master node 488(7) of the storage unit in that stage. The signal appearing at node 512 depends on which of two other transistors, namely transistors 514 and 516, is turned on. An SXI (sign extend input) signal drives the gate of transistor 514 and an $\overline{SXI}$ signal (i.e., the complement of the SXI signal) drives the gate of transistor 516. When transistor 516 is on, transistor 514 is off and the signal appearing at node 512 is the DATA_IN(0) signal. In this mode, the DATA_IN(0) signal provides the source of serial data that is input to the shift register. When transistor 516 is off, transistor 514 is on and the signal appearing at node 512 is the output signal of inverter 490(7). In this case, the shift register can be loaded with whatever value was first stored in the storage unit of stage(7). This mode is particularly useful for sign extension, e.g. when one shifts a negative number to the right in the shift register using bit mode (as might occur when dividing numbers by $2^n$, where n is an integer). When shifting a negative number to the right, ones must be loaded into the most significant bit in the number as the right shifting is taking place.

The signal path for shifting data to the left one bit at a time is established by a transistor 518(6) in stage(6) and corresponding transistors in stage(0) through stage(5) (of which only transistors 518(6) and 518(0) are shown in FIGS. 9A and 9B). Transistors 518(0)–518(6) are controlled by a B_SHIFT_LEFT bit shift left signal. To cause a transfer of the data bit from stage(6) to stage(7), the B-SHIFT-LEFT bit shift left signal is asserted, thereby causing transistor 518(6) to electrically couple the data value appearing at the output of inverter 490(6) to master node 488(7) of the neighboring stage(7). In a similar manner, the data bit stored in stage(5) is transferred to master node 488(6) of stage (6).

Stage(0) in each cell has additional circuitry which establishes a path for the transfer of the data bit from stage(7) of the next lower cell. The additional circuitry includes transistors 520, 522 and 524. Transistors 522 and 524 are controlled by the $\overline{SEL8}$ and the SEL8 cell select signals, respectively. Transistor 520 is controlled by the BIT_SHIFT_LEFT bit shift left signal. Transistors 522 and 524 determine the source of the signal which transistor 520 passes to master node 488(0) when transistor 520 is enabled by the BIT_SHIFT_LEFT bit shift left signal. In the case of cell(7), transistor 522 is coupled to signal line 480(6) which carries the value of the signal appearing at the output of the inverter on the slave side of the storage unit in stage(7) of cell(6) (not shown). Transistor 524 is coupled to the $V_{SS}$ supply, i.e., ground. If the SEL8 cell select signal is asserted (also implying that the $\overline{SEL8}$ cell select signal is deasserted), then transistor 524 is turned on while transistor 522 is turned off. Thus, the data that transistor 520 passes to master node 488(0) when the BIT_SHIFT_LEFT bit shift left signal is asserted is a zero bit. When the SEL8 cell select signal is deasserted and the BIT_SHIFT_LEFT bit shift left signal is asserted, the data that transistor 520 passes to master node 488(0) is the data bit which is stored in stage(7) of cell(6).

A fast normalization of the numbers stored in the shift register is performed by first invoking the byte shift left mode for seven control cycles followed by invoking the bit shift left mode for eight control cycles. Byte left shifting is permitted to continue until a byte appears in cell(7) of the shift register that contains a non-zero bit. Then, the bit shift left mode is invoked and bit left shifting is permitted to continue until a non-zero bit appears in stage(7) of cell (7). The presence of a nonzero bit is determined by monitoring the signals on the shift right lines 482(0) through 480(7) of cell(7).

E. Fast Normalization Circuitry

Figure 10:
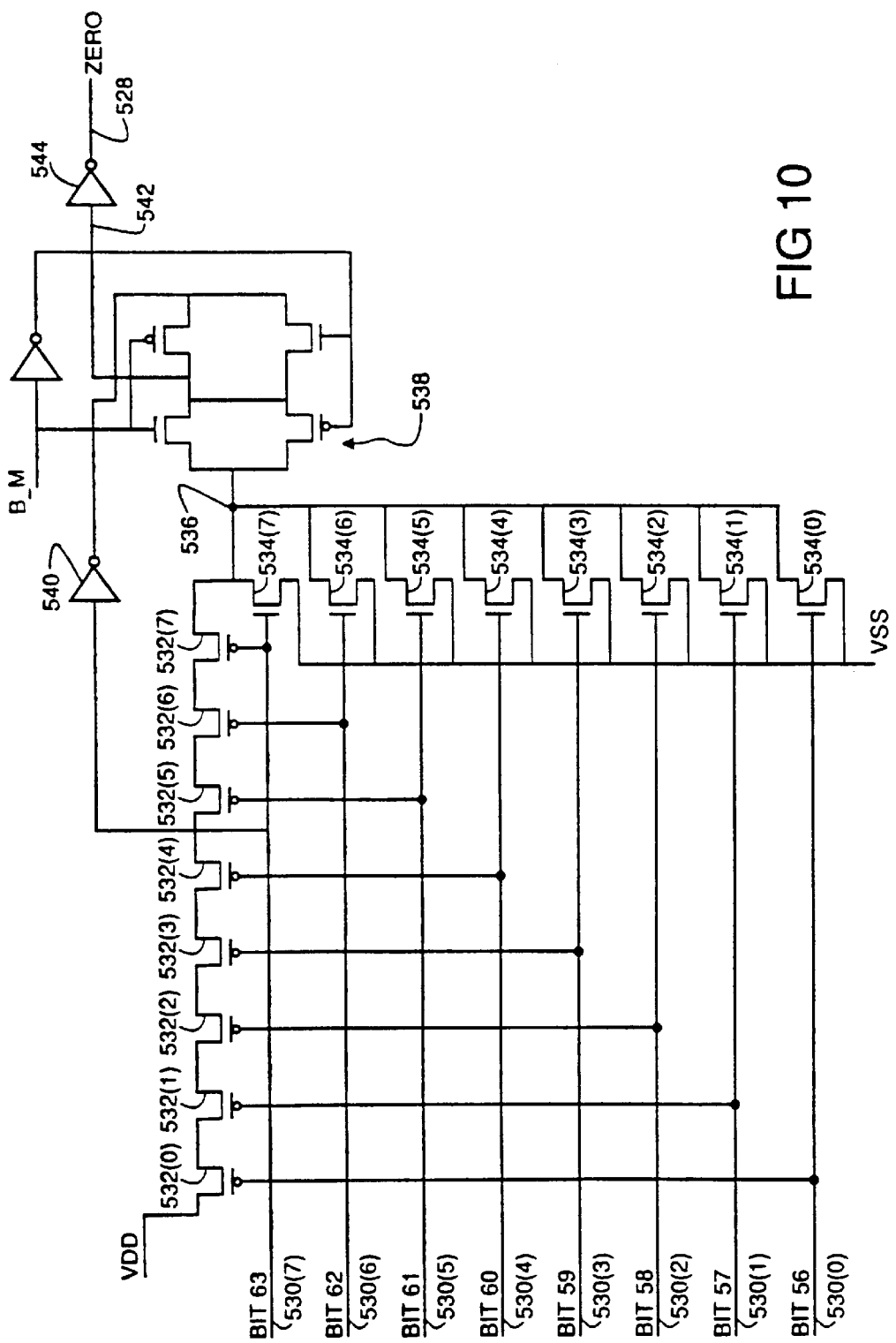
FIG. 10 is a circuit diagram of the circuit which detects the presence of a non-zero bit in the upper byte of the shift register.

The circuit in FIG. 10 determines whether or not there is a non-zero bit among the eight most significant bits stored in the shift register. If a non-zero bit is detected, a ZERO signal is asserted (i.e., driven HIGH) on an output line 528 thereby causing the shift register to stop shifting. If there are no non-zero bits in the relevant stages of the shift register, the ZERO signal remains deasserted and the shifting continues.

The contents of each of the eight stages of cell(7) appear on BIT56 through BIT63 signal lines 530(0)–530(7) which connect to shift right signal lines 482(0)–482(7), respectively (shown in FIG. 10). The signal on each of BIT56 through BIT63 signal lines 530(0)–530(7) drives a gate terminal of a different P-channel transistor of a group of eight P-channel transistors 532(0) through 532(7) that are connected in series, i.e., the drain terminal of one transistor being connected to the source terminal of another.

The signal on each of BIT56 through BIT63 signal lines 530(0)–530(7) also drives a gate terminal of a different N-channel transistor of another group of eight N-channel transistors 534(0) through 534(7) that are connected in parallel, i.e., the drain terminals of the transistors are connected to a node 536 and the source terminals of the transistors are connected to ground.

If the signals on BIT56 through BIT64 signal lines 530(0)–530(7) are zero, each of the eight P channel transistors are turned on thereby electrically coupling node 536 to the $V_{DD}$ supply. If any of the signals on BIT56 through BIT64 signal lines 530(0)–530(7) are non-zero, the corresponding one of P-channel transistor 532(0)–532(7) is turned off, thereby electrically decoupling node 536 from the $V_{DD}$ supply. The non-zero signal on the line, however, turns on a corresponding one of N-channel transistors 534(0)–534(7), thereby electrically coupling node 536 to the $V_{SS}$ supply.

The signal at node 536 provides one input to a multiplexer 538. The signal on BIT63 signal line 530(7), after being inverted by an inverter 540, provides a second input to multiplexer 538. The selection of which input signal multiplexer 538 passes to its output line 542 is controlled by the B_M byte mode signal. (Since multiplexer 538 is similar to previously described multiplexers its construction and operation will not be described in detail.) The signal on output line 542 passes to an inverter 544 which generates the ZERO signal on line 528. If the B_M byte mode signal is asserted, indicating that the shift register is operating in byte shift mode, multiplexer 538 selects the signal at node 536 as the signal which is passed to inverter 544. If the B_M byte mode signal is deasserted, indicating that the shift register is operating in bit shift mode, multiplexer 538 selects the signal from inverter 540 as the signal which is passed to inverter 544.

If the B_M byte mode signal is asserted and as long as all signal values on the BIT56 through BIT63 signal lines 530(0)–530(7) are zero, the ZERO signal remains deasserted. As soon as any signal on lines 530(0)–530(7) becomes nonzero (i.e., contains a one bit), the ZERO signal is asserted, halting all shifting in the shift register. With the B_M byte mode signal deasserted, the value of the ZERO signal is determined solely by the signal appearing on BIT63 signal line 530(7). As long as the signal on line 530(7) is zero, the ZERO signal remains deasserted. As soon as a one bit appears on line 530(7), the ZERO signal is asserted, again halting all shifting in the shift register.

Two shifting modes are possible, an M_shift shift mode and an unconditional-shift shift mode. In the M_shift shift mode, the M bit controls whether shifting is permitted. In the unconditional-shift shift mode, shifting is not affected by the state of the M bit.

In the M_shift shift mode, as long as the M bit is set to one, the relevant shift control signal (e.g. the B_SHIFT_LEFT byte shift left signal) is allowed to remain asserted thereby, causing the shift register to continue shifting. As soon as the M bit is deasserted, indicating that a one bit has appeared in the upper byte of the shift register in the case of byte shift mode (or in the position of the MSB in the case of bit shift mode), the relevant shift control signal is forced to zero causing an immediate halt to the shifting.

Figure 11:
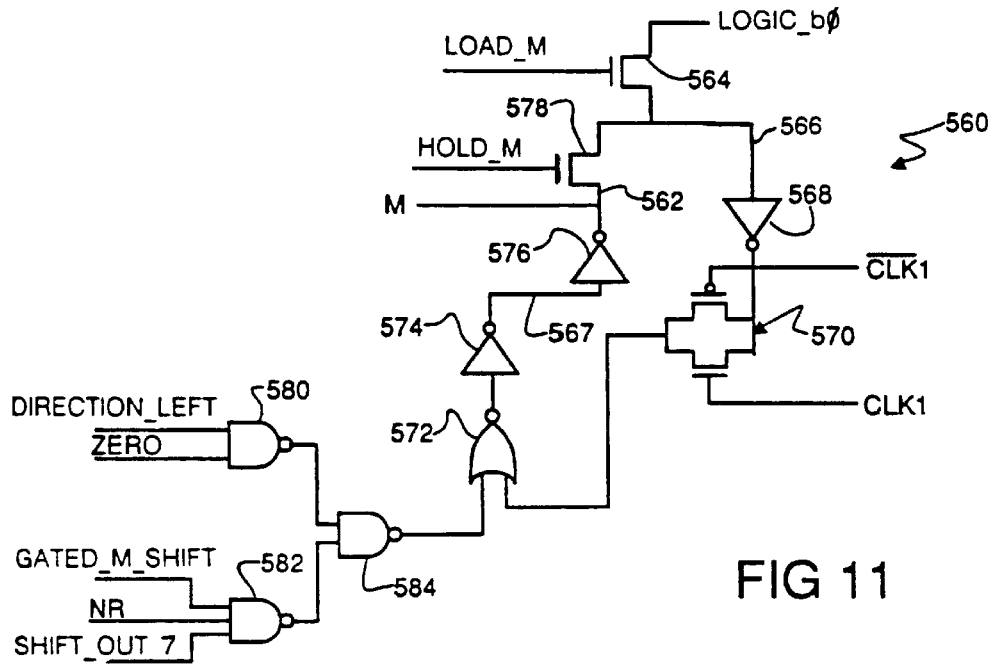
FIG. 11 is a circuit diagram of the auto shift stop circuit.

An auto shift stop circuit 560 for controlling this operation is shown in FIG. 11. During fast normalization operation, the M bit which is stored within the auto shift stop circuit at a node 562 is initialized to one. Then, circuit 560 monitors the ZERO signal. When the ZERO signal is asserted, circuit 560 clears the M bit.

Auto shift stop circuit 560 is initialized by loading a one bit into it over the logic_b0 signal line from logic box 54 (see FIG. 4). A transistor 564 that is controlled by a LOAD_M signal couples the signal on the logic b0 signal line to an input node 566 of an inverter 568 in stop circuit 560. Input node 566 is the master node of a master-slave latch. The input of another inverter 576 represents a slave node 567. The output of inverter 568 passes through a complementary pair of transistors 570 that are controlled by the CLK1 and $\overline{\text{CLK1}}$ clock signals. When the CLK1 is asserted, transistors 570 electrically couple the output of inverter 568 to one input of a NOR gate 572. When the CLK1 clock signal is deasserted, transistors 570 decouple the output of inverter 568 from the input of NOR gate 572. The output of NOR gate 572 drives the input of an inverter 574 which, in turn, establishes the signal value which is stored at slave node 567. Inverter 576 generates the value of the stored M bit at node 562.

A transistor 578 enables the stored value of the M bit to be recirculated within the latch. When a HOLD_M hold signal is asserted, transistor 578 electrically couples node 562 to input node 566, thereby loading the stored value of the M bit back into the master side of the latch.

When the value stored at master node 566 is transferred to the slave portion of the latch, NOR gate 572 determines whether the transferred value is forced to a zero. If the signal to the second input of NOR gate 572 is low, the M bit takes on the value stored at master node 566. Whereas, if the signal to the second input of NOR gate 572 is high, the value of the M bit is forced low. Thus, if the second input of NOR gate 572 is high and a one is stored at master node 566, it is transferred to slave node 567 as a one (i.e., HIGH) thereby forcing the value of the M bit to be a zero (i.e., LOW).

The signal which drives the second input of NOR gate 572 is generated by a circuit made up of three NAND gates 580, 582, and 584. The ZERO signal and the DIRECTION_LEFT shift direction signal drive the two inputs of NAND gate 580. A GATED_M_SHIFT signal, the NR neighbor signal and the SHIFT_OUT (7) signal drive the three inputs of NAND gate 582. The outputs of NAND gates 580 and 582 drive the two inputs of NAND gate 584.

When the fast normalization mode is first invoked, the DIRECTION_LEFT shift direction and the B_M byte mode signals are both asserted. If there are no non-zero bits among the eight most significant bits of the shift register, the ZERO signal will be in a LOW state. Thus, the level of the signal at the output of NAND gate 580 is HIGH. Note that the NR neighbor mode signal is not asserted during the normalization operation, thus, the level of the output of NAND gate 582 is also HIGH. Since the signal level of both inputs to NAND gate 584 are HIGH, the output of NAND gate 584 is LOW. As long as the ZERO signal remains LOW, the M bit remains at its initialized value through the sequence of control cycles during which the left shifting is taking place. As soon as the level of the ZERO signal goes HIGH, the output of NAND gate 580 goes LOW which, in turn, drives the output of NAND gate 584 HIGH. This clears the M bit.

Figure 12:
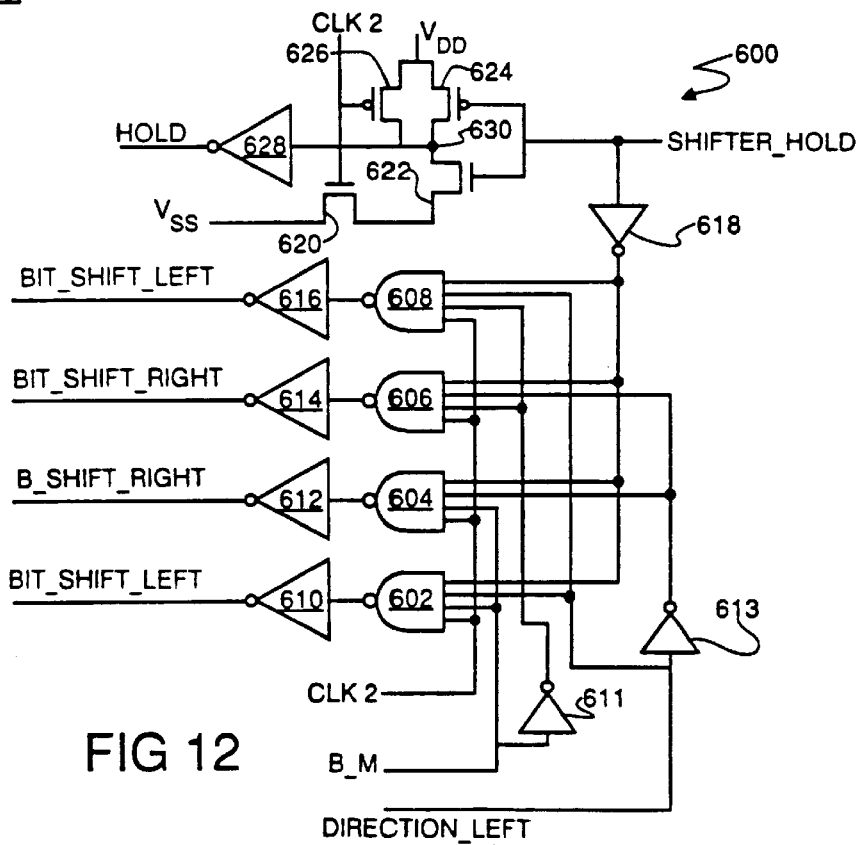
FIG. 12 is a circuit diagram of the shift register control circuit.

Referring to FIG. 12, a SHIFTER_HOLD shift control signal controls the shifting in the shift register. When the SHIFTER_HOLD shift control signal is deasserted the shift register shifts stored data in the direction determined by the condition of the DIRECTION_LEFT shift direction signal and by the amounts determined by the B_M byte mode signal. When the SHIFTER_HOLD shift control signal is asserted, the shift register stops shifting. The circuitry which establishes the condition of the SHIFTER_HOLD shift control signal (not shown) functions as follows.

Figure 13:
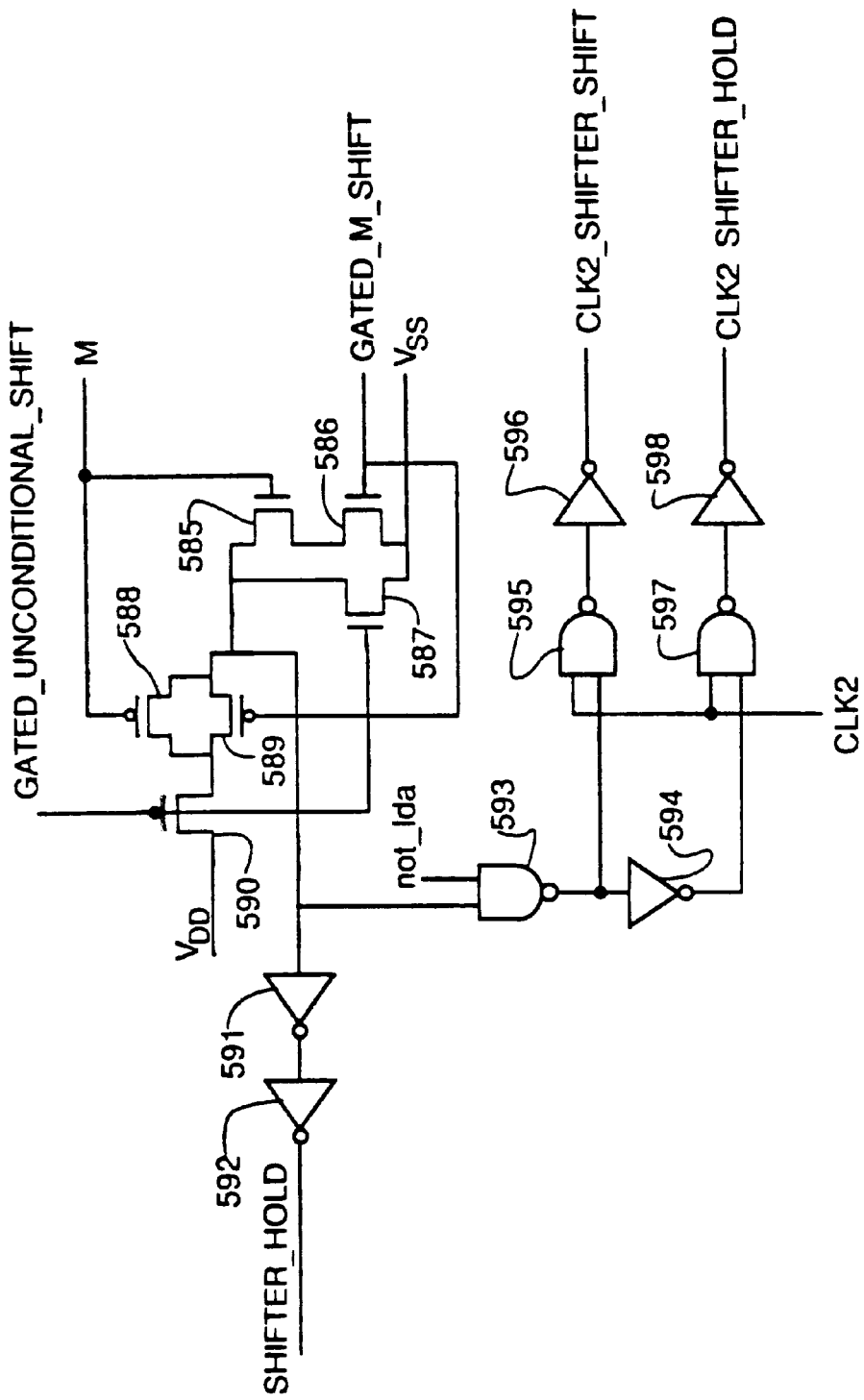
FIG. 13 is a circuit diagram of the circuitry which controls the state of the SHIFTER-HOLD shift control signal.

As shown in FIG. 13, the condition of the SHIFTER_HOLD shift control signal is determined by three other signals, namely, a GATED_UNCONDITIONAL_SHIFT control signal, a GATED_M_SHIFT control signal, and the value of the M bit. Thus, these control signals actually control the operation of the shift register through the SHIFTER_HOLD shift control signal.

The arrangement of transistors 585-590 determines the voltage that appears at an input of two inverters 591 and 592 connected in series. Transistor 590 has one terminal connected to the $V_{DD}$ supply. Transistors 586 and 587 each have one terminal connected to the $V_{SS}$ supply. And transistors 585, 587, 588 and 589 each have one terminal connected to the input of inverter 591. The value of the M bit drives the gate of N-type transistor 585 and the gate of P-type transistor 588. The GATED_UNCONDITIONAL_SHIFT control signal drives the gate of N-type transistor 587 and the gate of P-type transistor 590. And the GATED_M_SHIFT control signal controls the gate of N-type transistor 586 and the gate of P-type transistor 589.

When the GATED_UNCONDITIONAL_SHIFT control signal is asserted, transistor 590 is off and transistor 587 is on, pulling the input of inverter 591 down to the $V_{SS}$ supply. In other words, asserting the GATED_UNCONDITIONAL_SHIFT control signal allows shifting to take place in the shift register regardless of the condition of the M bit. On the other hand, when GATED_UNCONDITIONAL_SHIFT control signal is deasserted, transistor 590 is on and transistor 587 is off. In this condition, the GATED_M_SHIFT control signal along with the state of the M bit determines the voltage that is asserted at the input of inverter 591.

With the GATED_UNCONDITIONAL_SHIFT control signal deasserted, when the GATED_M_SHIFT control signal is also deasserted, transistor 586 is off and transistor 589 is on, thereby pulling the input of inverter 591 up toward the $V_{DD}$ supply and forcing the SHIFTER_HOLD signal shift control signal to also go high. In this state, shifting is not permitted and the condition of the M bit has no affect on the SHIFTER_HOLD shift control signal. On the other hand, when the GATED_M_SHIFT control signal is asserted, transistor 589 is off and transistor 586 is on. In this condition, the value of the M bit controls the condition of the SHIFTER_HOLD control signal. When the M bit is set high, transistor 585 is on and the input voltage of inverter 591 is pulled down toward the $V_{SS}$ supply, thereby allowing shifting to take place. As soon as the M bit is cleared, transistor 585 turns off and transistor 588 turns on, thereby pulling both the input voltage of inverter 591 and the SHIFTER_HOLD shift control signal high and stopping shifting in the shift register.

The circuit in FIG. 13 also generates a CLK2_SHIFTER_SHIFT control signal and a CLK2_SHIFTER_HOLD control signal, both of which control the operation of an adder V bit circuit to be described later (see FIG. 15). The signal at the input of inverter 591 also drives one input of a NAND gate 593. The signal at the other input of NAND gate 593 is determined by a bit in the microword, namely, a bit which controls the operation of the adder latch. When the adder latch is not being instructed to load data (i.e., when the microword bit that controls the adder latch is not asserted), NAND gate 593 sends the complement of signal at the input of inverter 591 to one input of a NAND gate 595 and to the input of an inverter 594. (Note, of course, that the signal at the input of inverter 591 has the same value as the SHIFTER_HOLD shift control signal.) The output of inverter 594, which is also the same value as the SHIFTER_HOLD shift control signal, drives an input of a second NAND gate 597. The second inputs of NAND gate 595 and of NAND gate 597 are both driven by the CLK2 clock signal. The output of NAND gate 595 drives the input of an inverter 596 to generate the CLK2_SHIFTER_SHIFT control signal and the output of NAND gate 597 drives the input of an inverter 598 to generate the CLK2_SHIFTER_HOLD control signal.

Referring to FIG. 12, the SHIFTER_HOLD shift control signal controls the operation of a shift register control circuit 600 which generates the signals that govern the shifting in the shift register. Other input signals to shift register control circuit 600 include the B_M byte mode signal, the DIRECTION_LEFT shift direction signal, and the CLK2 clock signal. Shift register control circuit 600 generates five output signals, namely, the BIT_SHIFT_LEFT and the BIT_SHIFT_RIGHT bit shift signals and the B_SHIFT_LEFT and the B_SHIFT_RIGHT byte shift signals, and the HOLD signal.

Shift control circuit 600 includes four NAND gates 602–608 each of which drives the input of an associated inverter 610–616. The outputs of the four inverters directly drive the shift register shown in FIG. 8. Inverter 610 generates the B_SHIFT_LEFT byte shift left signal, inverter 612 generates the B_SHIFT_RIGHT byte shift right signal, inverter 614 generates the BIT_SHIFT_RIGHT bit shift right signal, and inverter 616 generates the BIT_SHIFT_LEFT bit shift left signal. Circuit 600 also includes two inverters on the input side of the circuit, namely, inverter 611, which inverts the B_M byte mode signal, and inverter 613, which inverts the DIRECTION_LEFT shift direction signal.

The signals which control the operation of the shift control circuit 600 are as follows. The CLK2 clock signal drives one input terminal on each of NAND gates 602–608. The B_M byte mode signal drives a second input terminal on each of NAND gates 602 and 604; and the inverted B_M byte mode signal drives a second input terminal on each of the other two NAND gates 606 and 608. The DIRECTION_LEFT shift direction signal drives a third input terminal on each of NAND gates 602 and 608; and the inverted DIRECTION_LEFT shift direction signal drives a third terminal on each of the other two NAND gates 604 and 606. Finally, the SHIFTER_HOLD shift control signal after being inverted by an inverter 618 drives a fourth input terminal on each of NAND gates 602–608.

Assuming for illustrative purposes that the byte shift left fast normalization mode is invoked, the operation of the circuit will now be described. To invoke the byte shift left mode, both the B_M byte mode signal and the DIRECTION_LEFT shift direction signal are asserted. To invoke the fast normalization mode, the GATED_M_SHIFT signal is asserted and the M bit is initialized to HIGH, thereby forcing the SHIFTER_HOLD signal to be deasserted. Under these conditions, when the CLK2 clock signal is asserted during a control cycle, only one of the NAND gates 602–608 has all of its input terminals in a high condition, namely, NAND gate 602. Thus, only NAND gate 602 outputs a signal level which is low, and the output of the other NAND gates 604–608 remain at a high level. This means that only the B_SHIFT_LEFT byte shift left signal is asserted during the control cycle while the other shift control signals remain deasserted. As long as the input signals to the NAND gates 602–608 remain as described above, the shift register continues to shift data to the left one byte at a time, i.e., one byte each control cycle.

As soon as a non-zero bit is detected in the upper byte of the data in the shift register, auto shift stop circuit 560 (see FIG. 11) clears the M bit, causing the SHIFTER_HOLD shift control signal to be asserted as previously described. When the SHIFTER_HOLD shift control signal is asserted, the corresponding input terminal on each of NAND gates 602–608 goes low, forcing the output level of each of NAND gates 602–608 to be high. This deasserts the B_SHIFT_LEFT byte shift left signal and halts the shifting within the shift register.

Control circuit 600 operates in a similar manner for the other shifting modes.

Control circuit 600 also generates the HOLD signal which is used to recirculate the stored data in the storage units of each stage of the shift register. The HOLD signal generating portion of circuit 600 includes N-channel transistors 620 and 622, which together establish a path to the $V_{SS}$ supply, P-channel transistors 624 and 626, each of which establishes a path to the $V_{DD}$ supply, and inverter 628. The SHIFTER_HOLD shift control signal drives the gate terminals of transistors 622 and 624 and the CLK2 clock signal drives the gates of transistors 620 and 626. When the SHIFTER_HOLD shift control signal is deasserted, transistor 622 is off and transistor 624 is on, thereby electrically coupling the $V_{DD}$ supply to node 630 at the input of inverter 628. This forces the HOLD signal to a low condition and disables the hold circuit while the shift register is shifting.

When the SHIFTER_HOLD shift control signal is asserted, transistor 624 turns off, decoupling node 630 from the $V_{DD}$ supply, and transistor 624 turns on, enabling transistor 620 to control the voltage at node 630. When the CLK2 clock signal goes high, transistor 620 pulls the voltage at node 630 down to the $V_{SS}$ supply. This, in turn, causes the HOLD signal to be asserted during this phase of the control cycle. The CLK2 clock signal also controls the gate terminal of transistor 626 which is connected between node 630 and the $V_{DD}$ supply. During the phase of the control cycle when the CLK2 clock signal goes high, transistor 626 is off and the voltage at node 630 is held low by transistor 620. During the phase of the control cycle when the CLK2 clock signal goes low, transistor 620 turns off and transistor 626 pulls the voltage at node 630 up to the $V_{DD}$ supply. In other words, whenever the SHIFTER-HOLD shift control signal is asserted, the HOLD signal is asserted during that phase of every control cycle when the CLK2 signal goes high and it is deasserted during the remainder of the control cycle.

IV. Fast Normalization Operation

A software algorithm controls the shifting operation during fast normalization of the mantissa of a floating point number. In the described embodiment which assumes a 64-bit mantissa, the algorithm invokes seven left byte shift cycles followed by eight left bit shift cycles, i.e., the maximum number of byte and bit shifts that may be necessary to achieve complete normalization of the 64-bit number stored in the shift register. During the left shifting, adder latch 57 (see FIG. 4) keeps track of the number of byte left shifts which occur before the M bit is cleared. Then, the M bit is reasserted for the bit left shifting phase of the normalization process and again adder latch 57 keeps track of the number of bit left shifts which occur before the M bit is again deasserted. These two numbers are combined to compute the total number of left bit shifts that were performed to normalize the number and this is used to compute the new exponent for the normalized floating point number.

It takes fifteen full control cycles to perform the normalization for all processors in the grid array. Though many of the processors will complete the normalization long before the full fifteen cycles have been completed, it is possible that at least one of the processors requires the full fifteen cycles to shift the leading zeros out of its shift register.

During the left shifting, adder latch 57 is simply incremented to keep track of the number of cycles. The incrementing is performed with the aid of the CARRY signal stored in CARRY latch 55. At the beginning of an add operation, the SET C set carry signal from the microword is used to set the carry signal to one. Then, the contents of adder latch 57 are passed to full adder 51 via boolean logic circuit 54. If the M bit is set to one, full adder 51 adds the stored value from adder latch 57 to the value of carry signal, thereby incrementing the value obtained from adder latch 57. The incremented value (i.e., the output of full adder 51) is then stored to adder latch 57, replacing the previously stored value. This operation is repeated for each control cycle in which the M bit remains set to one. As soon as the M bit is cleared, shifting halts and adder latch 57 does not update with a new incremented value.

Figure 14:
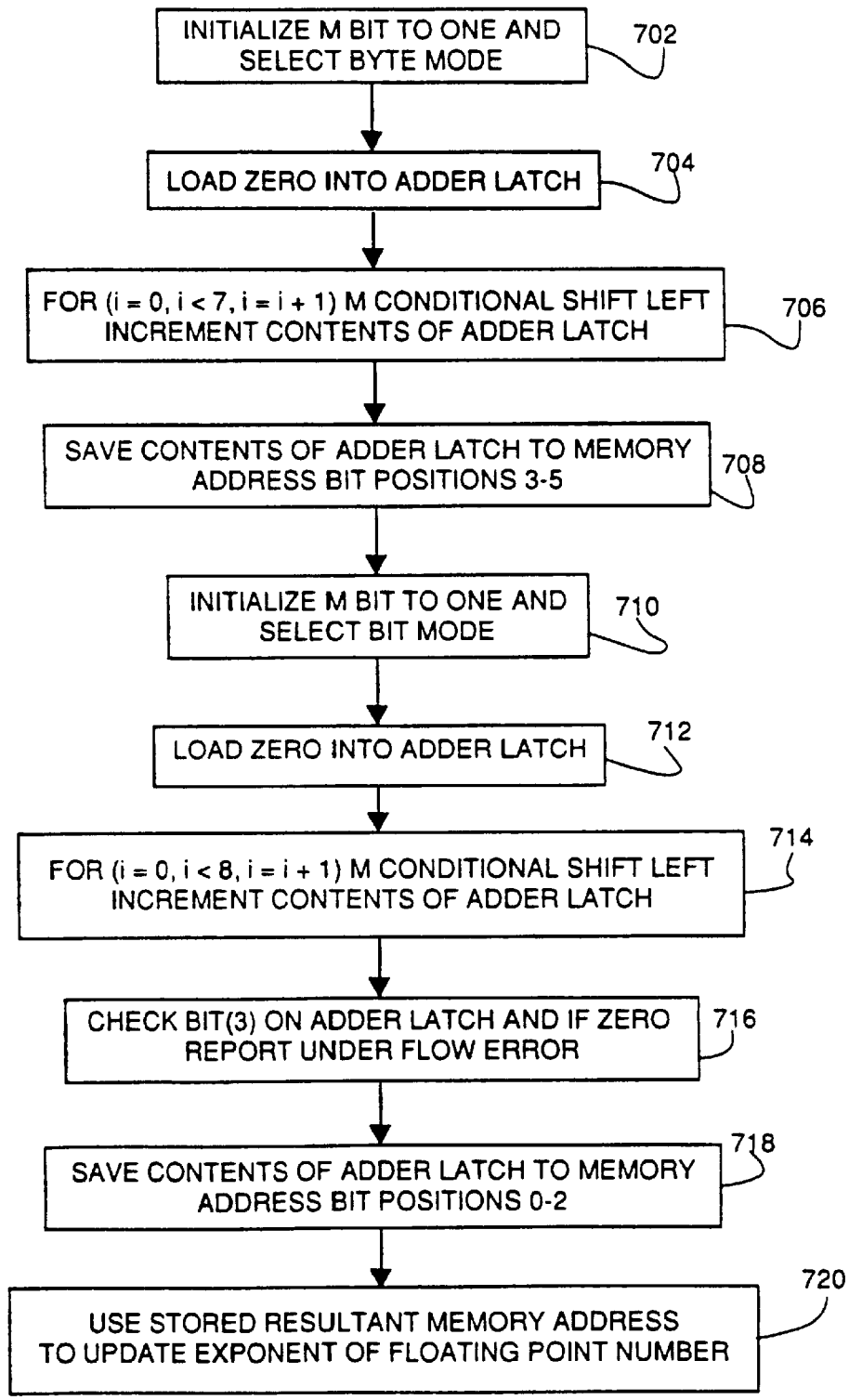
FIG. 14 is a flow diagram of the fast normalization algorithm.

The details of the fast normalization algorithm for a 64-bit mantissa are presented in FIG. 14. At the start of the normalization procedure, the M bit is initialized to one and byte mode is selected (step 702). The M bit is initialized to one by loading a one into auto shift stop circuit 560 from logic circuit 54 over the logic_b0 line (see FIG. 11) as previously described. After initialization, a zero is loaded into adder latch 57 (step 704). This is accomplished by setting the logic function of logic circuit 54 to zero, by asserting the CLO clear shift register output signal from the control microword, by asserting the CL C clear carry signal from the control microword and by loading the results of an add operation from full adder 51 into adder latch 57. In other words, the inputs to adder 51 are all forced to zero and the output of adder 51 which is thus also a zero is loaded into adder latch 57. (Recall that an asserted CLO clear shift register signal causes circuit 56 to output a zero into full adder 51 and an asserted CL C clear carry signal forces the carry signal into adder 51 to also be zero.)

With the contents of adder latch 57 initialized to zero, the algorithm enters a for-loop in which an M conditional shift left instruction is executed (i.e., GATED_M_SHIFT asserted) and the contents of adder latch 57 are incremented for every shift left which actually occurs (step 706). Incrementing of the contents of adder latch 57 is accomplished by asserting the CLO clear shift register signal, by asserting the SET C set carry signal from the control microword so as to force the carry signal to one, by reading the contents of adder latch 57 onto the DATA(7:0) bus so that they can be sent to adder 51 by logic circuit 54 and by performing an add operation in adder 51. The result from adder 51 is loaded back into adder latch 57, replacing the previous value with the incremented value. In this way, the contents of adder latch 57 keeps track of the number of byte left shifts which have occurred during the for-loop.

Note that shifting of shift register 52 and loading of adder latch 57 are allowed to occur only so long as the M bit is asserted during a GATED_M_SHIFT (i.e., conditional M shift). Adder latch 57, like shift register 52, employs a master slave configuration. Recall that when the HOLD signal is asserted, shift register 52 does not shift but rather recirculates the stored value within the master/slave parts of the storage units within the stages of the shift register. The HOLD signal controls adder latch 57 in a similar way. When the HOLD signal is asserted (which occurs upon clearing the M bit), the stored value in adder latch 57 recirculates within adder latch 57 and is not updated. (Note, lda also allows the adder latch.) As soon as a nonzero bit is detected in the upper byte of shift register 52, the M bit is cleared and both the shifting of shift register 52 and the loading of new data into adder latch 57 are halted. Thus, even though further iterations of the for-loop might still occur, the contents of neither shift register 52 or adder latch 57 are affected by those iterations which happen after the M bit is cleared. If the original unshifted mantissa in shift register 52 contained a non-zero bit, then the M bit would have been cleared prior to entering the for-loop and the initialized value in adder latch 57 would never have been incremented beyond zero.

After the for-loop has completed and a non-zero bit has been moved into the upper byte of shift register 52, the contents of adder latch 57 are stored in bit positions 3 through 5 of a selected memory address (step 708). The number stored at the selected memory address represents the total number of bit shifts which have occurred during fast normalization. Remember that each shift in the byte shift left phase of the normalization operation represents a shift of eight bits. So the actual number of bit shifts can be derived from the contents of adder latch 57 by adding three zeros to the least significant end of the number.

After completing the byte shift phase of the normalization, the fast normalization algorithm enters the bit shifting phase to move the most significant non-zero bit in the upper byte into the most significant bit position of shift register 52. First, the algorithm sets the M bit and selects bit shift mode (step 710). Then, the algorithm initializes the contents of adder latch 57 to zero in preparation for counting the number of bit shifts which will occur (step 712). After initialization, the algorithm enters a for-loop in which an M conditional shift left instruction is executed eight times and the contents of adder latch 57 are incremented in the manner previously described (step 714). Each shift moves the number in shift register 52 one bit to the left until a non-zero bit appears in the most significant bit position. The final number in adder latch 57 represents the total number of bit shifts which actually occurred and will be less than or equal to eight.

If eight bit shifts actually occurred during this second phase of the fast normalization operation, that means the number was shifted completely out of shift register 52 and a non-zero did not appear in the mantissa. In other words, an underflow occurred indicating the number was too small to be represented by the a 64-bit number. The algorithm checks for the occurrence of an underflow error by looking at the third bit position of the number stored in adder latch 57 (i.e., the third bit starting at zero). If a one appears in that position, the algorithm reports an underflow error to the array control unit via the OR tree described earlier (step 716).

If an underflow is not detected, the algorithm stores the contents of adder latch 57 in bit positions 0 through 2 of the selected memory address (step 718). The number stored at the selected memory address now represents the total number of bit shifts which were necessary to normalize the contents of shift register 52.

V. Fast Row/Column Broadcast Operation

It is often necessary or useful to broadcast data from one PE to all other PE's in the same row/column. For example, this is useful in matrix multiplications. The described embodiment includes a fast row/column broadcast mechanism which accomplishes this in a fast and effective manner. The fast row/column broadcast mechanism operates the row/column down which data is to be broadcast as a pipeline. That is, a bit of the multi-bit data is injected into the selected row/column and as it propagates down the selected row/column, the next bit of the number is also injected into the selected row/column. This continues until all bits of the number have been introduced into the pipeline. The multi-bit data that is broadcast includes a "stop" bit followed by the number which is to be broadcast. As will be described shortly, the stop bit serves to notify the shift register in each processing element when the number has been fully loaded into the shift register. By using this mechanism in a 128×128 processor grid array, it is possible to complete a broadcast of a 32 bit block of data to all processors in a selected row/column in 161 (i.e., 128+32+1) control cycles.

The details of the fast row/colum broadcast mechanism are as follows. Before initiating the broadcast, the SHFT SIZE shift register size signal from the control microword, sets the size of the shift register in each PE to equal the size of the number being broadcast and the array control unit clears the shift registers in all of the PE's. This can be accomplished by setting the logic function of logic circuit 54 to zero (i.e., it outputs zero valued bytes) and repeatedly loading zeros into shift register 52 until the shift register contains all zeros. After clearing shift register 52, the PE which is broadcasting the number injects a one bit (i.e., the "stop" bit) into the grid using the nearest neighbor mechanism. After injecting the stop bit, the PE injects the sequence of data bits representing the number. As the data moves down the selected row/column, it is loaded into the shift register of each processing element. Note that the adder latch 57 is loaded and read out onto the DATA bus 58 each cycle and that enables the broadcast data to go to the neighbor circuit (i.e., Mux 80 and DEMUX 83) which passes it on to the next PE and into the shift register of the next PE in the row/column. When the number has been fully loaded into a shift register of a given PE, the stop bit "pops" out the end of the shift register, signalling that shifting must halt. The appearance of the stop bit clears the M bit and halts the shifting.

The circuitry shown in FIG. 11 monitors the SHIFT_OUT (7) signal line to detect the stop bit. The signal on the SHIFT_OUT (7) signal line drives one input of the three-input NAND gate 582. The other two inputs of NAND gate 582 are driven by the NR neighbor signal and the GATED_M_SHIFT signal, respectively. In the broadcast mode, both the NR neighbor signal and the GATED_M_SHIFT signal are asserted. The output of NAND gate 582 remains asserted so long as the signal on the SHIFT_OUT (7) signal line remains low (i.e., deasserted) and it is deasserted as soon as the signal on the SHIFT_OUT (7) signal line is asserted.

The output of NAND gate 582 drives one input of the two-input NAND gate 584. The other input of NAND gate 584 is driven by the output of NAND gate 580. Recall that NAND gate 580 is controlled by the DIRECTION_LEFT signal and the ZERO signal. During the fast row/column broadcast, the DIRECTION_LEFT signal is deasserted so the output of NAND gate 580 is high. This means that when the SHIFT_OUT (7) signal is asserted, indicating the stop bit has passed through the shift register, then the output of NAND gate 584 goes high. This clears the M bit stored at node 562 in the auto shift stop circuit and halts the shifting in the shift register.

Note that the largest constant which can be broadcast using this mechanism is 56 bits plus the stop bit (assuming a 64 bit shift register as described herein). When the 56$^{th}$ bit is loaded, the stop bit shifts into stage(7) of cell(0) of the shift register and appears on the SHIFT_OUT (7) signal line. Stage(7) of cell(0) is the last stage in the shift register which has access to the SHIFT_OUT (7) signal line.

VI. Adder V Bit Circuit

Figure 15:
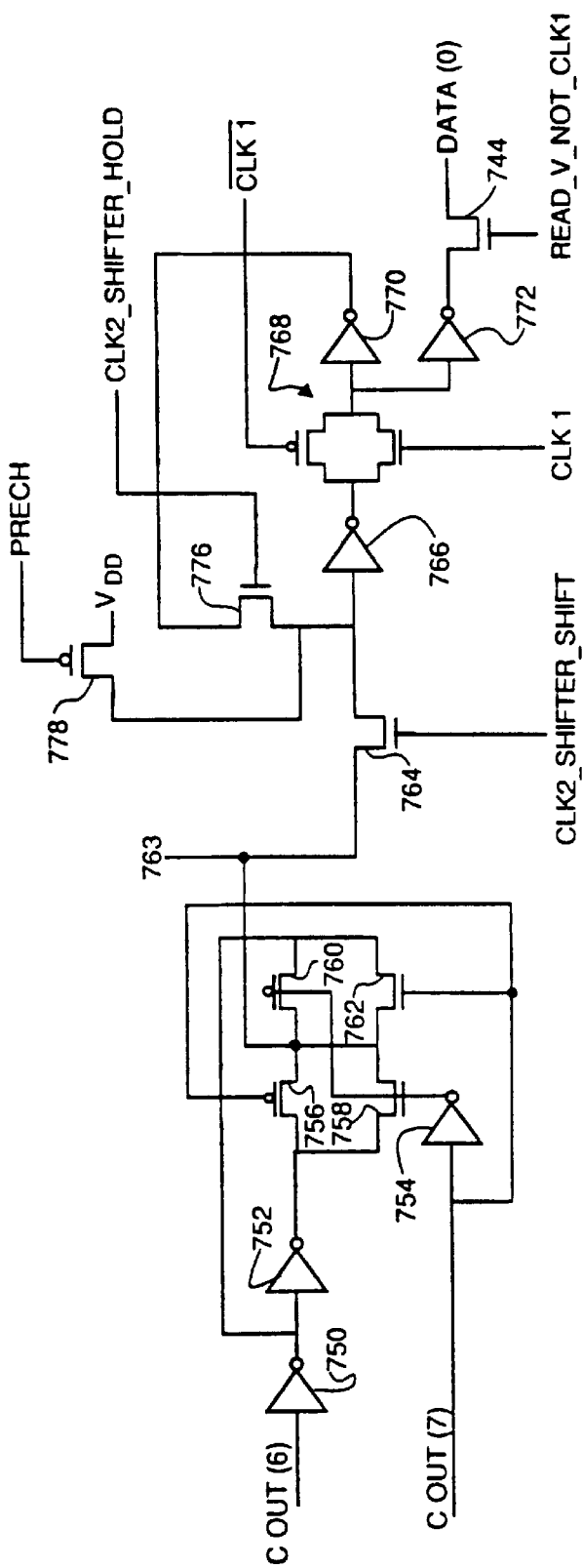
FIG. 15 is a circuit diagram of the V bit circuit.

Referring to FIG. 15, each processing element also includes an adder V Bit circuit for indicating whether an overflow condition has occurred in full adder 51. The adder V bit circuit operates by taking the exclusive OR between the carry signals of the two most significant bits in adder 51, i.e., C OUT(7) and C OUT(6). Since two's complement representation is used for negative numbers, if the exclusive OR of the two carry signals results in a one, then an overflow has occured. The overflow condition is reported to the array control unit via the M bit and the OR tree (see FIG. 5). The details of the V bit circuit are as follows.

The adder V bit circuit includes a multiplexer made up of an inverter 754 and two complementary transistor pairs 756–758 and 760–762 connected in series, as shown. This mulitplexer is similar both in structure and operation to multiplexer 300 used in the data bus parity circuit shown in FIG. 7. The C OUT(6) signal, after passing through two inverters 750 and 752, is one input to the mulitplexer and the complement of the C OUT(6) signal, i.e., the output of inverter 750, is the other input of the multiplexer. Depending upon the value of the C OUT(7) signal, either the C OUT(6) signal or its complement is passed to an output node 763. Note that this configuration implements the XOR function of the C OUT(6) and the C OUT(7) signals. If the C OUT(7) signal is low, then the signal at node 763 is the C OUT(6) signal. Whereas, if the C OUT(7) signal is high, then the signal at node 763 is the complement of the C OUT(6) signal.

The V bit is stored in a dynamic latch formed by two inverters 766 and 770. The input terminal of inverter 766 represents the master node and the input terminal of inverter 770 represents the slave node. A complementary transistor pair 768 transfers the signal from the master node to the slave node in response to the CLK1 clock signal. The output of inverter 770 can be fed back to the master node through a transistor 776 by asserting a CLK2_SHIFTER_HOLD control signal at the gate of transistor 776. This circulates the V bit within the dynamic latch when the shifting within the shift register has been halted. Another transistor 778 serves to precharge the input terminal of the dynamic latch to a high value at the beginning of each control cycle by pulling the master node up toward the V$_{DD}$ supply during the precharge portion of the control cycle, i.e., when the PRECH precharge signal is asserted. An inverter 772 and transistor 774, which is controlled by a READ_V_NOT_CLK1 read v bit signal, provides a signal path for transferring the V bit onto the DATA(0) line of the data bus.

The adder V bit circuit operates as follows. When the PRECH precharge signal is asserted at the gate of transistor 778 during the first part of the control cycle, a high value is stored into the master node. If the shifter is enabled, then the CLK2_SHIFTER_SHIFT control signal is asserted during the next phase of the control cycle and the exclusive or of the C OUT(7) and the C OUT(6) carry out signals is loaded from node 763 into the master node of the dynamic latch. During the first phase of the next control cycle, when the CLK1 clock signal is asserted, the complement of the value of the V bit that is stored in the master node is transferred to the slave node. Inverter 772 inverts the value stored at the slave node and, when the READ_V_NOT_CLK1 read V bit signal is asserted, transistor 774 passes this value (i.e., the value of the stored V bit) onto the DATA(0) signal line.

Once the V bit is placed on the DATA(0) signal line, it is passed through logic box 54 and loaded into the M bit circuit using the LOAD_M load signal (see FIG. 11 and the accompanying description). Once its value is loaded into the M bit, the M bit is passed to the previously described OR tree (see FIG. 5) and on to the array control unit. If any of the processing elements in the array asserts its V bit, indicating an overflow in its adder, the DONE X signal for the corresponding chip goes high and the DONE OUT signal to the array control unit also goes high. When the array control unit detects the high DONE OUT signal, indicating an overflow, it responds by invoking a service routine to identify which processing element generated the overflow.

The adder V bit circuitry saves three cycles as compared to the traditional way of determining whether an overflow has occurred. In conventional SIMD machines, adder overflow is calculated manually by checking the sign of the result, with the sign of the operands. This typically requires three additional cycles. For mathematics using short numbers, the adder V bit circuitry can double the speed. Even for 32 bit mathematics, which takes 12 cycles, the improvement in speed will be about 20–30%.

Other embodiments are within the following claims.

What is claimed is:

1. A processing array comprising:

a plurality of processing elements; and a bidirectional interconnection network disposed to directly connect all of adjacent neighboring processing elements for each of said plurality of processing elements for carrying data messages between any of the adjacent neighboring processing elements, wherein each of said processing elements of said plurality of processing elements comprises:

a parity generating circuit for generating a parity bit for a first data message that is transmitted by that processing element over the interconnection network to another processing element among said plurality of processing elements; and a parity checking circuit for checking parity of a second data message as it is received by that processing element over the interconnection network, said parity checking and parity generating circuits being separate from each other and enabling that processing element to generate parity for the first data message being sent by that processing element while simultaneously checking parity of the second message being received by that processing element.

2. The processing array of claim 1 wherein in each of said processing elements of said plurality of processing elements, the parity generating circuit for that processing element comprises an exclusive OR circuit which performs an exclusive OR operation on the first data message that is transmitted by that processing element to generate a parity bit for that first data message.

3. The processing array of claim 2 wherein within each of said processing elements of said plurality of processing elements, the parity checking circuit comprises a logic box that is configurable to perform a selected one of a plurality of different logic operations including an exclusive OR operation and when that parity checking circuit is performing a parity checking function its logic box is configured to perform the exclusive OR operation on the second data message.

4. The processing array of claim 3 wherein each processing element further comprises:

an output data path for carrying the first data message as it is being transmitted by that processing element; and a memory connected to the output data path which stores the first data message prior to its being transmitted by that processing element, wherein the parity generating circuit for that processing element is connected to the output data path for that processing element.

5. The processing array of claim 4 wherein within each processing element the parity generating circuit for that processing element includes means for placing the parity bit which it generates for the first data message onto the output data path at the end of the first data message.

6. The processing array of claim 4 wherein each processing element further comprises:

an input data path for carrying the second data message that is received by that processing element as it is being received; and a shift register connected to the input data path for receiving and holding the second data message received over the input data path; and wherein the parity checking circuit for that processing element is connected to the input data path for that processing element.

7. The processing array of claim 6 wherein in each processing element the input data path includes a multiplexer having an input connected to the output data path of that processing element, wherein said multiplexer enables the output data path to be electrically coupled to or electrically isolated from the input data path depending upon a state of the multiplexer.

8. A processing array comprising:

a plurality of processing elements each of which comprises:

an output data path disposed to directly connect to all of adjacent neighboring processing elements for each of said plurality of processing elements;

a memory connected to the output data path for storing a first data message that is to be sent to a recipient processing element for that processing element, said recipient processing element for that processing element being one of said plurality of processing elements;

a parity generating circuit connected to the output data path, said parity generating circuit generating a parity bit for said first data message as that processing element reads said first data message from its memory out onto its output data path for transmission to another processing element in the processing array;

an input data path disposed to directly connect to all of adjacent neighboring processing elements for each of said plurality of processing elements, and which receives a second data message sent by another processing element among said plurality of processing elements;

a shift register connected to the input data path for storing the second data message received over the input data path; and a parity checking circuit connected to the input data path, said parity checking circuit checking parity of the second data message as said second data message is received over the input path and while the first data message is being sent out over the output data path.

* * * * *